(12) United States Patent
Hirobe et al.

(10) Patent No.: US 11,628,877 B2
(45) Date of Patent: Apr. 18, 2023

(54) MOUNT BASE, MOUNTING UNIT, OPERATING DEVICE, AND MOVING VEHICLE

(71) Applicant: Panasonic Intellectual Property Management Co., Ltd., Osaka (JP)

(72) Inventors: Masahiro Hirobe, Shiga (JP); Shinichiro Sasaki, Aichi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 75 days.

(21) Appl. No.: 17/402,993

(22) Filed: Aug. 16, 2021

(65) Prior Publication Data

US 2021/0371004 A1    Dec. 2, 2021

Related U.S. Application Data

(63) Continuation of application No. PCT/JP2020/004303, filed on Feb. 5, 2020.

(30) Foreign Application Priority Data

Feb. 21, 2019  (JP) .............................. JP2019-029916

(51) Int. Cl.
*B62D 1/184* (2006.01)
*B60Q 1/14* (2006.01)

(52) U.S. Cl.
CPC ............ *B62D 1/184* (2013.01); *B60Q 1/1461* (2013.01); *B60Q 1/1469* (2013.01)

(58) Field of Classification Search
CPC ........ B62D 1/184; B62D 1/10; B60Q 1/1461; B60Q 1/1469; B60R 16/02
See application file for complete search history.

(56) References Cited

U.S. PATENT DOCUMENTS 5,450,769 A * 9/1995 Hu .................... B60R 16/027
                                                74/484 R
5,780,796 A * 7/1998 Uchiyama ............. B60R 16/027
                                                200/61.54

(Continued)

FOREIGN PATENT DOCUMENTS

DE      198 42 225     3/2000
JP      11-227572      8/1999

(Continued)

OTHER PUBLICATIONS

Official Communication issued in International Patent Application No. PCT/JP2020/004303, dated Apr. 21, 2020, along with an English translation thereof.

*Primary Examiner* — Drew J Brown
(74) *Attorney, Agent, or Firm* — Greenblum & Bernstein, P.L.C.

(57) ABSTRACT

A mount base includes: a base body having an insert hole to pass the steering shaft therethrough and holding the operating member thereon; a hook insertable into a fixing hole of the column; and an insert space located opposite from the insert hole with respect to the hook. The hook comes into contact with a locking member inserted into the insert space to have its movement regulated in a direction in which the hook disengages itself from the fixing hole. A mounting unit includes the mount base and the locking member. An operating device includes the mounting unit and the operating member. A moving vehicle includes the operating device, a steering shaft, and the column.

20 Claims, 15 Drawing Sheets

(56) References Cited

U.S. PATENT DOCUMENTS

| | | | | |
|---|---|---|---|---|
| 5,883,348 | A * | 3/1999 | Yokoyama | H02B 1/04 200/61.54 |
| 6,145,402 | A * | 11/2000 | Nishitani | B62D 1/105 74/484 R |
| 6,403,900 | B2 * | 6/2002 | Hecht | B60K 37/06 200/61.54 |
| 6,462,290 | B1 * | 10/2002 | Matsumoto | B60Q 1/1461 200/61.54 |
| 6,501,033 | B2 * | 12/2002 | Pastwa | B60Q 1/1461 200/61.54 |
| 6,548,773 | B2 * | 4/2003 | Matsumoto | B60Q 1/1461 200/61.54 |
| 8,919,814 | B2 * | 12/2014 | Akahori | B60Q 1/1469 280/771 |
| 2002/0056623 | A1 * | 5/2002 | Matsumoto | B60Q 1/1461 200/61.54 |
| 2005/0269192 | A1 * | 12/2005 | Mochizuki | B60Q 1/1469 200/61.54 |
| 2008/0006515 | A1 | 1/2008 | Mitsui et al. | |
| 2009/0090826 | A1 | 4/2009 | Takahashi | |
| 2016/0247647 | A1 | 8/2016 | Usuya et al. | |

FOREIGN PATENT DOCUMENTS

| | | |
|---|---|---|
| JP | 2000-021272 | 1/2000 |
| JP | 2002-362259 | 12/2002 |
| JP | 2008-13012 | 1/2008 |
| JP | 2009-090754 | 4/2009 |
| JP | 2016-157612 | 9/2016 |

\* cited by examiner

MOUNT BASE, MOUNTING UNIT, OPERATING DEVICE, AND MOVING VEHICLE

CROSS-REFERENCE TO RELATED APPLICATIONS

The present application is a Bypass Continuation of International Application No. PCT/JP2020/004303 filed on Feb. 5, 2020, which is based upon, and claims the benefit of priority to, Japanese Patent Application No. 2019-029916, filed on Feb. 21, 2019. The entire contents of both applications are incorporated herein by reference.

TECHNICAL FIELD

The present disclosure generally relates to a mount base, a mounting unit, an operating device, and a moving vehicle. More particularly, the present disclosure relates to a mount base for use to mount an operating member onto a column for rotatably supporting a steering shaft, and also relates to a mounting unit, an operating device, and a moving vehicle, each of which includes such a mount base.

BACKGROUND ART

JP 2016-157612 A discloses a switch device to be mounted onto a column post (i.e., column) for rotatably supporting the steering shaft of an automobile thereon. On this switch device, mounted is an operating lever (i.e., operating member) for use to operate various types of onboard equipment including turn signal lamps, headlights, fog lamps, windshield wipers, and washers.

The switch device includes: a switch body having an insert hole to pass the steering shaft therethrough and holding the operating lever; a circular cylindrical fitting portion for fitting the switch body into the column post; and a band clamp for clamping the fitting portion onto the column post. The band clamp may be configured as, for example, a leaf spring obtained by forming an elastic metallic material into a ring shape.

In general, such a band clamp is usually installed around the fitting portion with an expansion pin attached to extend the inside diameter thereof. Drawing this expansion pin out allows the fitting portion to be tightly clamped onto the column post by the band clamp.

Nevertheless, once drawn out, the expansion pin not only needs to be disposed of but also may fall into the vehicle body, for example. Thus, it is troublesome to have the switch device of JP 2016-157612 A mounted successfully.

In addition, the band clamp including the expansion pin is expensive. Furthermore, once the expansion pin has been drawn out, it is difficult to extend the inside diameter of the band clamp to replace the switch device or for any other purposes.

SUMMARY

The present disclosure provides a mount base, a mounting unit, an operating device, and a moving vehicle, all of which facilitate mounting an operating member onto a column for rotatably supporting a steering shaft thereon.

A mount base according to an aspect of the present disclosure is designed to be used to mount an operating member onto a column to rotatably support a steering shaft thereon. The mount base includes: a base body having an insert hole to pass the steering shaft therethrough and configured to hold the operating member thereon; a hook insertable into a fixing hole of the column; and an insert space located opposite from the insert hole with respect to the hook. The hook is configured to come into contact with a locking member inserted into the insert space to have its movement regulated in a direction in which the hook disengages itself from the fixing hole.

A mounting unit according to another aspect of the present disclosure includes the mount base described above and the locking member to be inserted into the insert space of the mount base.

An operating device according to still another aspect of the present disclosure includes the mounting unit described above and the operating member held by the mount base of the mounting unit.

A moving vehicle according to yet another aspect of the present disclosure includes: the operating device described above; the steering shaft passing through the insert hole of the operating device; and the column supporting the steering shaft rotatably.

BRIEF DESCRIPTION OF DRAWINGS

The figures depict one or more implementations in accordance with the present teaching, by way of example only, not by way of limitations. In the figures, like reference numerals refer to the same or similar elements.

DETAILED DESCRIPTION

First Embodiment (1) Overview

Figure 1:
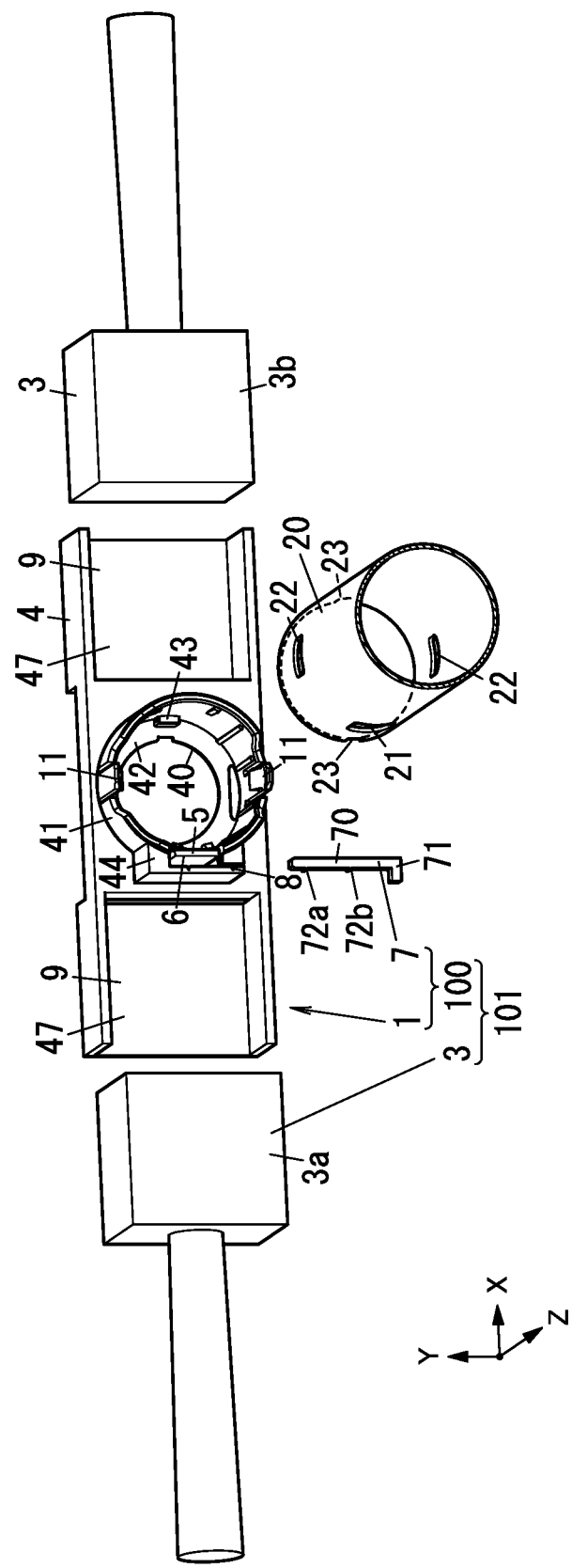
FIG. 1 is an exploded perspective view schematically illustrating an operating device according to a first embodiment.
Figure 2:
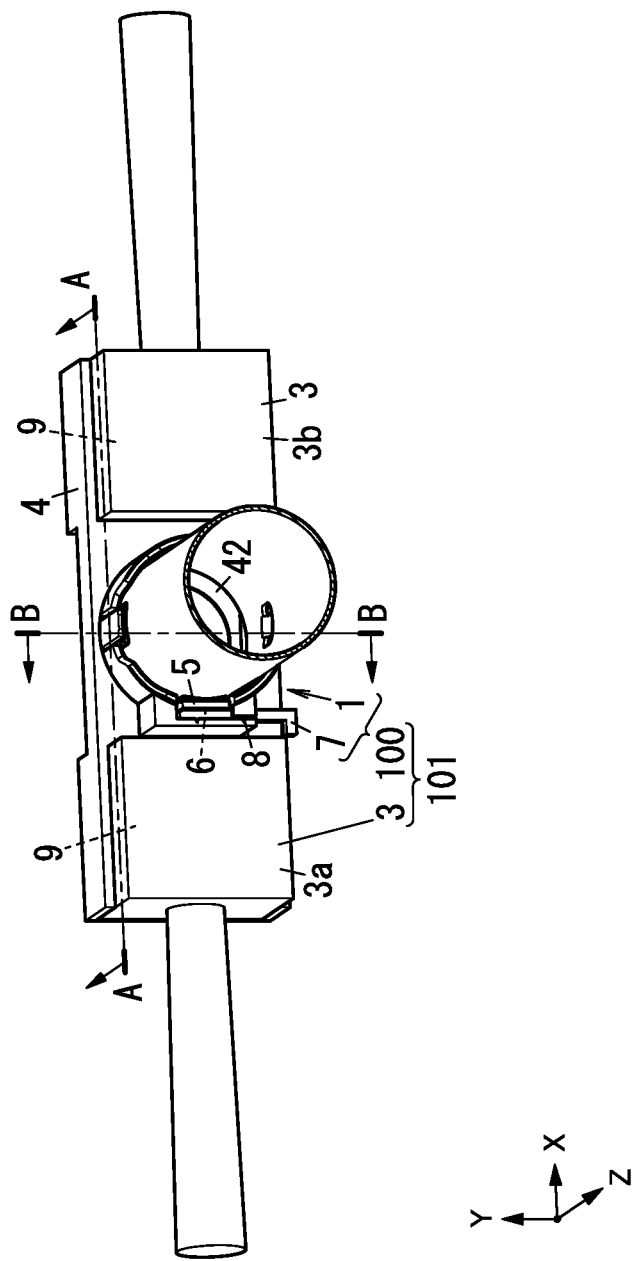
FIG. 2 is a perspective view schematically illustrating an assembled state of the operating device.

As shown in FIGS. 1 and 2, a mount base 1 according to a first embodiment is a member used to mount an operating member 3 onto a column 20 to rotatably support a steering shaft 2 (see FIG. 3) thereon. The mount base 1 includes: a base body 4 having an insert hole 40 to pass the steering shaft 2 therethrough and holding the operating member 3 thereon; a hook 5 insertable into a fixing hole 21 of the column 20; and an insert space 6 located opposite from the insert hole 40 with respect to the hook 5. The hook 5 comes into contact with a locking member 7 inserted into the insert space 6 to regulate movement of the hook 5 in a direction in which the hook 5 disengages itself from the fixing hole 21.

Also, a mounting unit 100 according to the first embodiment includes the mount base 1 described above and the locking member 7 to be inserted into the insert space 6 of the mount base 1.

Furthermore, an operating device 101 according to the first embodiment includes the mounting unit 100 described above and the operating member 3 held by the mount base 1 of the mounting unit 100.

Furthermore, a moving vehicle 102 (see FIG. 3) according to the first embodiment includes: the operating device 101 described above; a steering shaft 2 passing through the insert hole 40 of the operating device 101; and the column 20 supporting the steering shaft 2 rotatably.

In the mount base 1, mounting unit 100, operating device 101, and moving vehicle 102 according to the first embodiment, inserting the locking member 7 into the insert space 6 allows the locking member 7 to regulate movement of the hook 5 in a direction in which the hook 5 disengages itself from the fixing hole 21. This eliminates the need to draw the expansion pin out of the band clamp and dispose of the expansion pin, which is required by the switch device of the known example, thus facilitating mounting the mount base 1 onto the column 20. This makes it easier to mount the operating member 3 onto the column 20.

(2) Details

Next, the mount base 1, mounting unit 100, operating device 101, and moving vehicle 102 according to this embodiment will be described in detail with reference to FIGS. 1-6.

In the following description, X-, Y-, and Z-axes are defined as three axes that are perpendicular to each other. Particularly, the "Z-axis" is defined herein to be an axis aligned with the center axis of the insert hole 40 of the mount base 1 and the center axis of the column 20. The "X-axis" is defined herein to be an axis aligned with the length of the mount base 1. The "Y-axis" is perpendicular to both of these X- and Z-axes. In the following description, the directions aligned with the X-, Y-, and Z-axes will be hereinafter referred to as an "X-axis direction," a "Y-axis direction," and a "Z-axis direction," respectively. Also, in the following description, the Z-, X-, and Y-axis directions will be hereinafter sometimes referred to as a "forward/backward direction," a "rightward/leftward direction," and an "upward/downward direction," respectively. Note that each of the X-, Y-, and Z-axes is a virtual axis. That is to say, the arrows indicating "X," "Y," and "Z" are shown on the drawings just for the sake of convenience of description and are all insubstantial ones. In addition, these directions should not be construed as limiting the directions in which the mount base 1, the mounting unit 100, and the operating device 101 are supposed to be used.

As used herein, if something is "aligned with" something else, this phrase means that these two things are substantially parallel to each other. That is to say, these two things may naturally be exactly parallel to each other but may also be arranged to form an angle falling within the range from more than zero degrees to several degrees (e.g., less than 10 degrees) between themselves. Specifically, the center axis of the insert hole 40 is substantially parallel to the Z-axis (i.e., may be either exactly parallel to the Z-axis or form an angle of about several degrees or less with respect to the Z-axis). In this embodiment, the center axis of the insert hole 40 is exactly parallel to the Z-axis as an example.

(2-1) Column

First, the column 20 will be described in detail.

The column 20 has a generally circular cylindrical shape as shown in FIG. 1. On each of the drawings, only one longitudinal end portion (i.e., an end portion in the Z-axis direction) of the column 20 is illustrated.

The column 20 has a fixing hole 21 to which a hook 5 is inserted and a pair of second fixing holes 22. Each of the fixing hole 21 and the pair of second fixing holes 22 is a rectangular hole. The fixing hole 21 penetrates in the X-axis direction through a portion of the peripheral wall of the column 20. Each of the pair of second fixing holes 22 penetrates in the Y-axis direction through a portion of the peripheral wall of the column 20. The pair of second fixing holes 22 are arranged to face each other in the Y-axis direction. Note that these fixing holes 21, 22 do not have to be holes penetrating through portions of the peripheral wall of the column 20 but may also be recesses.

One longitudinal end portion (i.e., an end portion in the Z-axis direction) of the column 20 is provided with two cutouts 23. The two cutouts 23 are arranged to face each other in the X-axis direction. In this embodiment, one of the two cutouts 23 and the fixing hole 21 are arranged side by side in the Z-axis direction.

The column 20 is fixed onto the moving vehicle 102 (see FIG. 3) and supports the steering shaft 2 rotatably inside. To the tip portion of the steering shaft 2 protruding from the column 20, mounted is a steering wheel 103.

(2-2) Mount Base

Next, the mount base 1 will be described in detail.

As shown in FIGS. 1 and 2, the mount base 1 includes not only the base body 4, the hook 5, and the insert space 6 but also a holding structure 8 for holding the locking member 7 at an unlocked position where the locking member 7 is out of contact with the hook 5 and one or more attachment portions 9, to each of which another member is attached. In this embodiment, another member is the operating member 3.

The base body 4 may be a resin molded product, for example. The base body 4 is formed such that the insert hole 40 penetrates in the Z-axis direction through a middle portion in the X-axis direction of the base body 4. From a region surrounding the insert hole 40 of the base body 4, a generally circular cylindrical portion 41 protrudes toward one end point in the Z-axis direction. The cylindrical portion 41 is provided to leave a gap between the insert hole 40 and the cylindrical portion 41 itself. The insert hole 40 and the cylindrical portion 41 are provided concentrically with each other.

The base body 4 includes a receiving portion 42, which is provided between the insert hole 40 and the cylindrical portion 41. The receiving portion 42 receives the tip surface of the column 20. The receiving portion 42 is provided with rectangular parallelepiped projections 43 to be fitted into the cutouts 23 of the column 20. As shown in FIG. 4B, in this embodiment, the receiving portion 42 is provided with two projections 43.

Figure 4A:
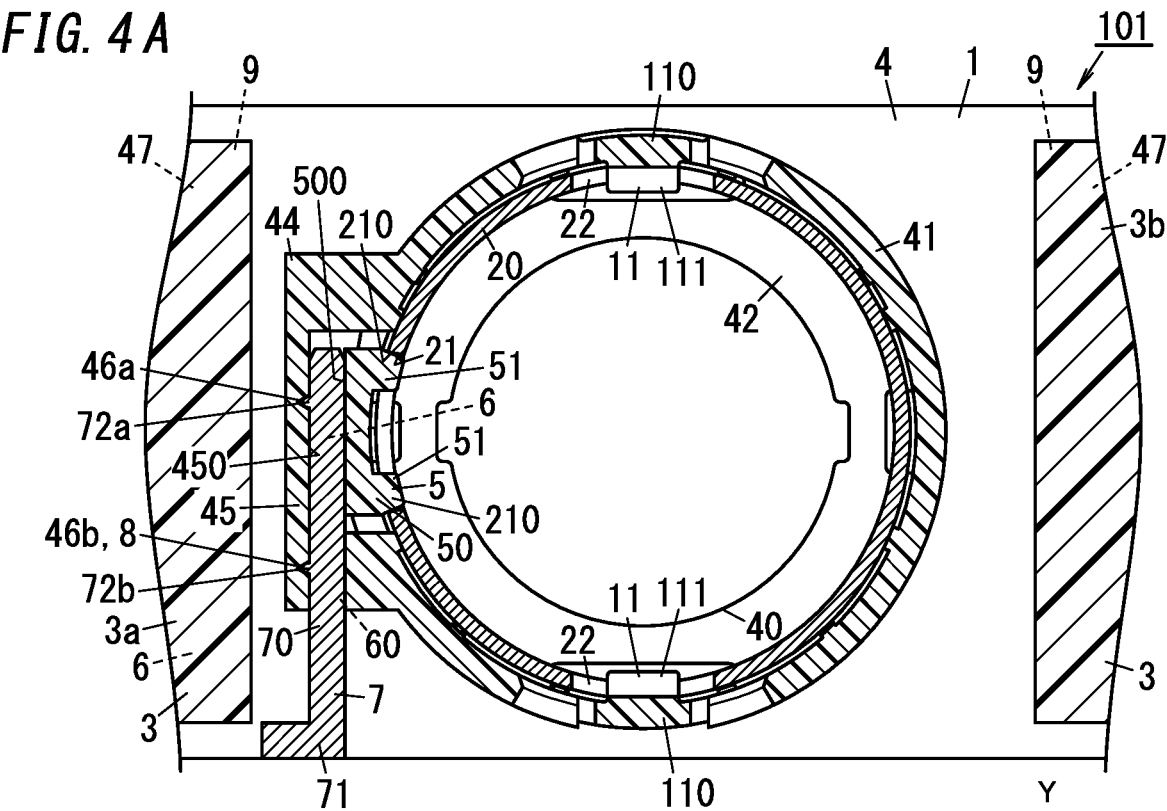
FIG. 4A is a cross-sectional view taken along the plane A-A shown in FIG. 2 and illustrating a state where the operating device is mounted onto a column for rotatably supporting a steering shaft.
Figure 4B:
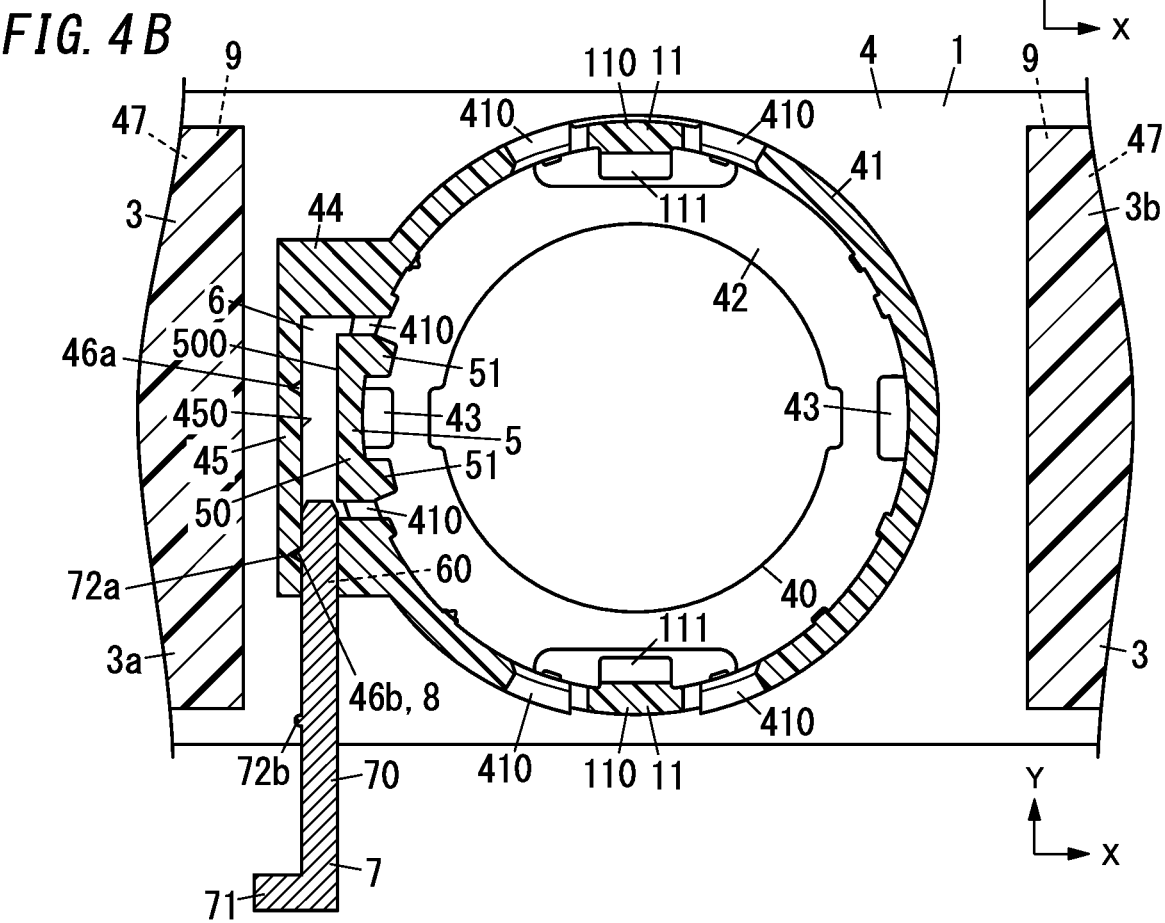
FIG. 4B is a cross-sectional view corresponding to the one shown in FIG. 4A and illustrating a state where the operating device is yet to be mounted onto the column.
Figure 5:
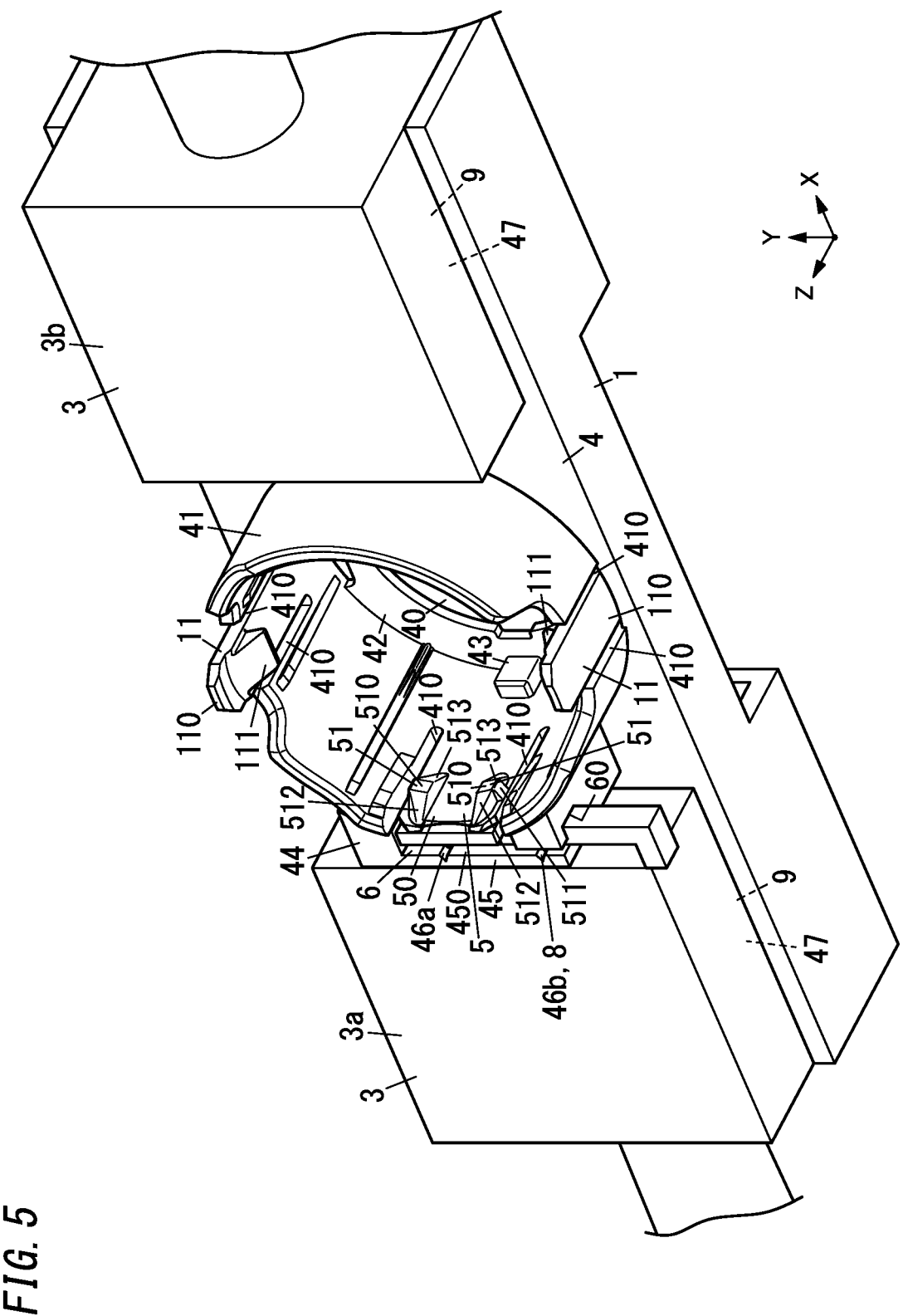
FIG. 5 is a perspective view illustrating, on a larger scale, a principal part of the operating device.

As shown in FIGS. 4B and 5, the cylindrical portion 41 has a plurality of slits 410 extending in the Z-axis direction. In this embodiment, the cylindrical portion 41 has six slits 410 which are arranged at intervals along its circumference. Each of these six slits 410 is cut out from the tip in the protruding direction (i.e., Z-axis direction) of the cylindrical portion 41 toward the basal end thereof.

Two slits 410 are provided for each of the two end portions in the Y-axis direction of the cylindrical portion 41. Two more slits 410 are provided for one end portion in the X-axis direction (i.e., for the left end portion in the example illustrated in FIG. 4B) of the cylindrical portion 41. The hook 5 is a part, located between the two slits 410 provided for one end portion in the X-axis direction, of the cylindrical portion 41.

The mount base 1 further includes a pair of second hooks 11. Each of the second hooks 11 is a part, located between the two slits 410 provided for an associated end portion in the Y-axis direction, of the cylindrical portion 41. Each of the second hooks 11 includes a stopper portion to come into contact with the edge of an associated one of the second fixing holes 22 to prevent the base body 4 from disengaging itself from the column 20. Each of the hook 5 and the second hooks 11 is elastically deformable. In the following description, the hook 5 and the second hooks 11 will be described with reference to the circumferential and radial directions of the cylindrical portion 41.

Figure 6:
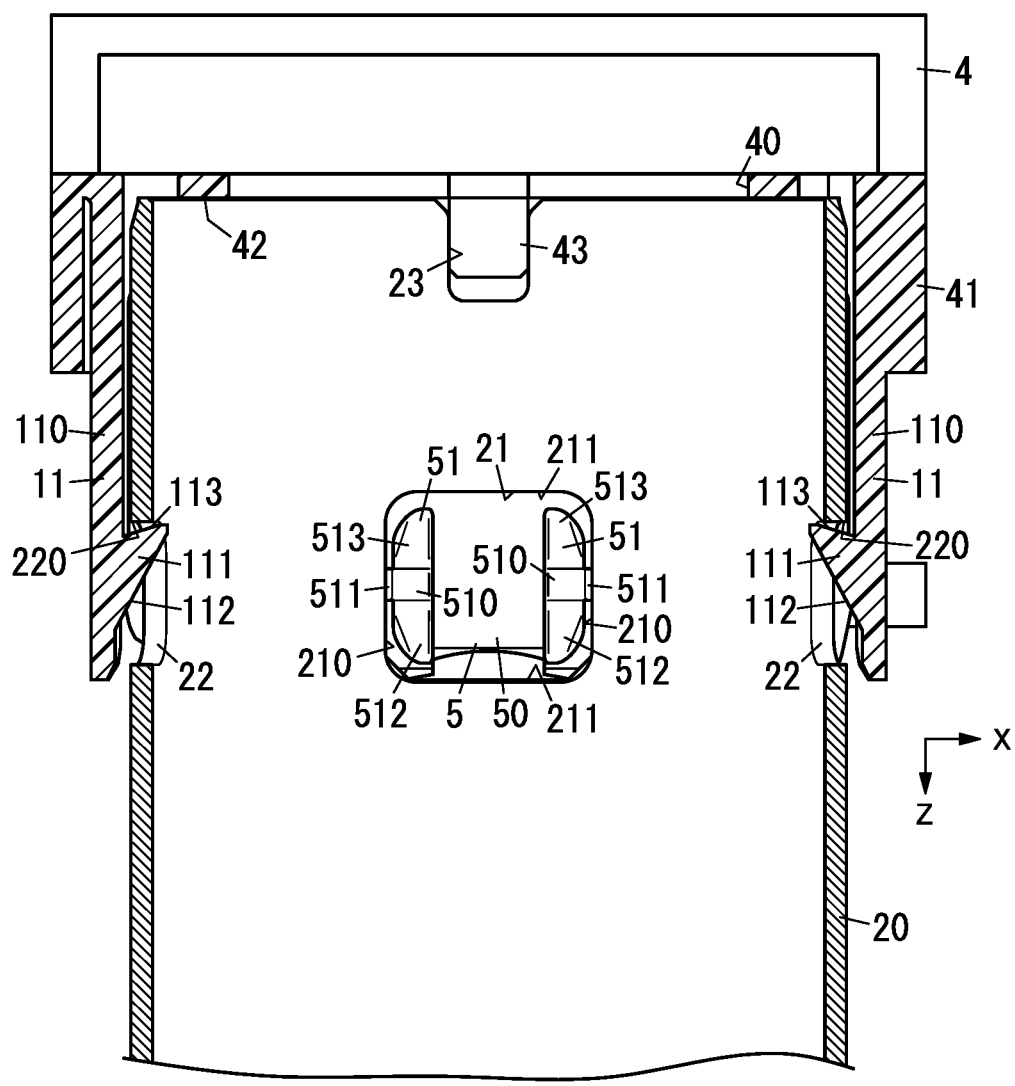
FIG. 6 is a cross-sectional view taken along the plane B-B shown in FIG. 2.
Figure 7:
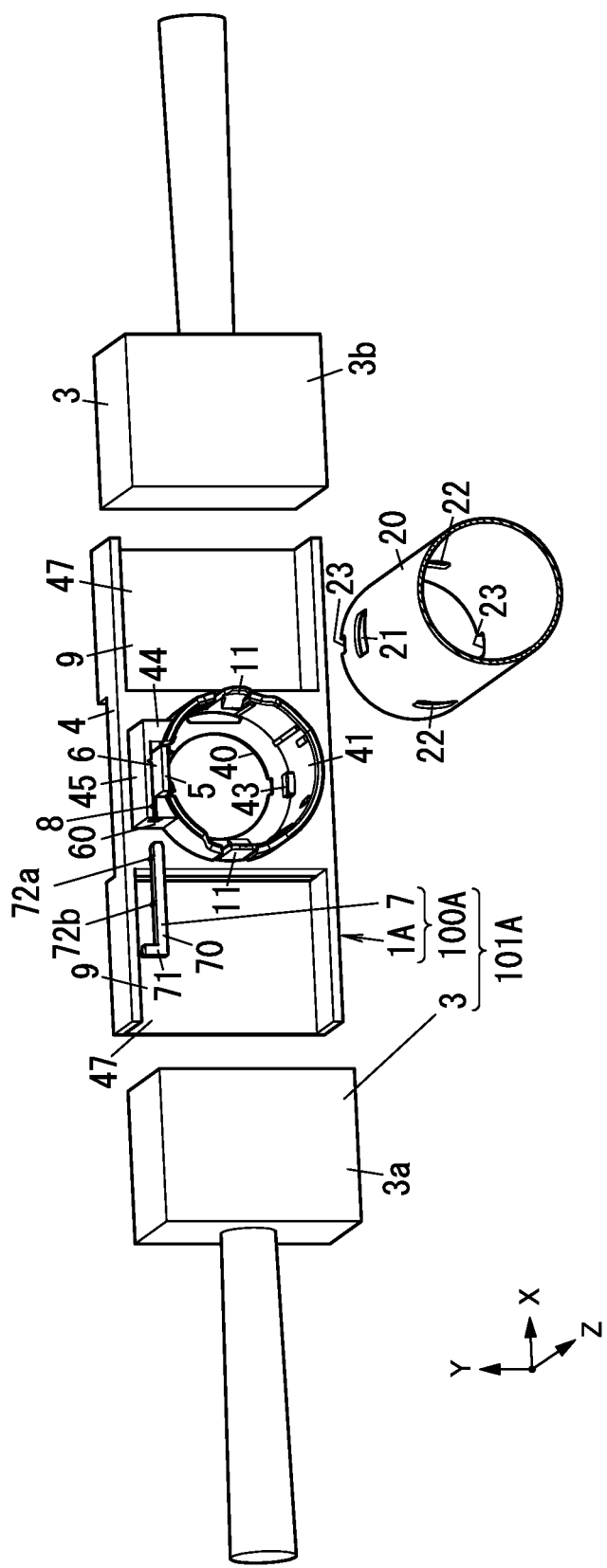
FIG. 7 is an exploded perspective view schematically illustrating an operating device according to a second embodiment.
Figure 8:
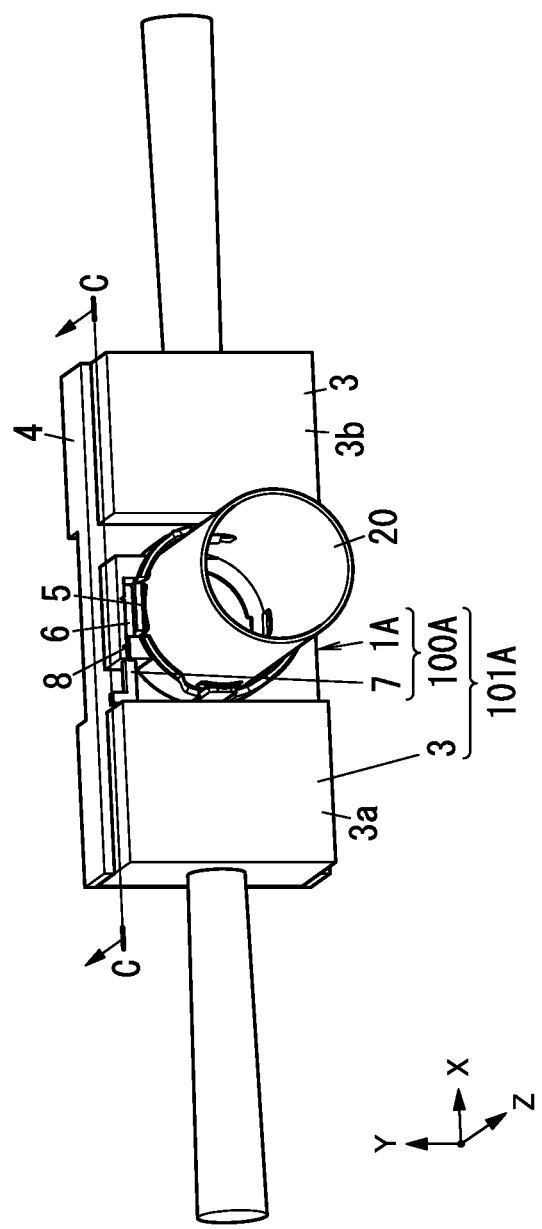
FIG. 8 is a perspective view schematically illustrating an assembled state of the operating device.

The hook 5 includes a stopper portion to come into contact with the edge of the fixing hole 21 to prevent the base body 4 from rotating with respect to the column 20. In this embodiment, the hook 5 includes a portion to be bitten by the edge of the fixing hole 21. More specifically, the hook 5 includes a plate-shaped body 50 and at least one protruding portion 51 protruding from an inner surface, facing radially inward, of the body 50. In this embodiment, the hook 5 includes two protruding portions 51. The two protruding portions 51 are portions to be inserted into the fixing hole 21 of the column 20 (see FIG. 4A). As shown in FIG. 6, the two protruding portions 51 are spaced from each other in the circumferential direction. The two protruding portions 51 are arranged to be bitten by both circumferential edges 210 of the fixing hole 21 of the column 20. The Z-axis length of each of the two protruding portions 51 is shorter than the Z-axis length of the fixing hole 21.

As shown in FIGS. 5 and 6, each of the two protruding portions 51 has a rectangular tip surface 510 located at a tip in the protruding direction, a fitting surface 511, a first sloped surface 512, and a second sloped surface 513. The fitting surface 511, the first sloped surface 512, and the second sloped surface 513 are continuous with respective side edges of the tip surface 510.

The fitting surface 511 is a sloped surface which is continuous with one circumferential end of the tip surface 510 and sloped with respect to the tip surface 510 such that as the distance from the tip surface 510 to a point on the fitting surface 511 increases, the radial distance from the point to the outer periphery decreases. The interval between the respective fitting surfaces 511 of the two protruding portions 51 increases as the radial distance to the outer periphery decreases. The respective fitting surfaces 511 of these two protruding portions 51 are the stopper portions that come into contact with the edges 210 of the fixing hole 21 to prevent the base body 4 from rotating with respect to the column 20 and that are bitten by the edges 210 of the fixing hole 21.

The first sloped surface 512 is a surface located closer to the tip of the cylindrical portion 41 than the tip surface 510 is. The first sloped surface 512 is continuous with one end in the Z-axis direction of the tip surface 510 and sloped with respect to the tip surface 510 such that as the distance from the tip surface 510 to a point on the first sloped surface 512 increases, the radial distance from the point to the outer periphery decreases.

The second sloped surface 513 is a surface located closer to the basal end of the cylindrical portion 41 than the tip surface 510 is. The second sloped surface 513 is continuous with the other end in the Z-axis direction of the tip surface 510 and sloped with respect to the tip surface 510 such that as the distance from the tip surface 510 to a point on the second sloped surface 513 increases, the radial distance from the point to the outer periphery decreases.

As shown in FIG. 4B, the inner surface, facing radially inward, of the body 50 is an arc-shaped curved surface and the outer surface 500, facing radially outward, of the body 50 is a flat surface. In a state where the hook 5 is not elastically deformed, the inner surface of the body 50 is flush with the inner surface of the rest of the cylindrical portion 41. As shown in FIG. 5, the two protruding portions 51 are provided on an end portion, located closer to the tip, of the inner surface of the body 50.

As shown in FIGS. 4B, 5, and 6, each of the second hooks 11 includes a body 110 provided between the two slits 410 and having a curved arc plate shape and a mountain-shaped projection 111 protruding radially inward from the body 110. The projection 111 includes a sloped surface 112 which is sloped such that as the distance from a point on the sloped surface 112 to the basal end of the cylindrical portion 41 decreases, the radial distance from the point to the center of the cylindrical portion 41 decreases. The projection 111 further includes a catching surface 113 continuous with an edge, located closer to the basal end, of the sloped surface 112 and sloped such that as the radial distance from a point on the catching surface 113 to the outer periphery decreases, the distance from the point to the tip of the cylindrical portion 41 decreases. The projection 111 is provided at an end portion, located closer to the tip, of the body 110. In a state where the second hook 11 is not elastically deformed, the inner surface of the body 110 is flush with the inner surface of the rest of the cylindrical portion 41.

In a state where the respective projections 111 of the second hooks 11 are caught on one edge 220 in the Z-axis direction of the second fixing holes 22 (i.e., the edge located closer to the tip of the column 20), the two protruding portions 51 of the hook 5 are located out of contact with both edges 211 in the Z-axis direction of the fixing hole 21 of the column 20.

The hook 5 has its body 50 elastically deformed and flexed radially outward (i.e., toward the insert space 6) as the first sloped surface 512 of each protruding portion 51 comes into contact with, and is pressed by, the tip surface of the column 20 when the cylindrical portion 41 is fitted onto the column 20. In the hook 5 thus deformed elastically, its body 50 recovers its previous state (i.e., returns to the previous position) as each protruding portion 51 of the cylindrical portion 41 is fitted into the fixing hole 21 of the column 20.

Each of the pair of second hooks 11 has its body 110 elastically deformed and flexed radially outward as the sloped surface 112 of each projection 111 comes into contact with, and is pressed by, the tip surface of the column 20 when the cylindrical portion 41 is fitted onto the column 20. In each of the pair of second hooks 11, its body 110 recovers its previous state (i.e., returns to the previous position) as each projection 111 of the cylindrical portion 41 is fitted into an associated one of the second fixing holes 22 of the column 20.

As shown in FIGS. 4B and 5, a holding wall 44 protrudes to surround the hook 5 from a portion, located radially outside of the cylindrical portion 41, of the base body 4. The holding wall 44 is integral with portions, adjacent to the hook 5 on both sides along its circumference, of the cylindrical portion 41. The holding wall 44 has a shorter Z-axis length than the cylindrical portion 41.

The holding wall 44 has a groove-shaped insert space 6 to which the locking member 7 is inserted. The insert space 6 has an opening 60 through which the locking member 7 is inserted. The insert space 6 is located radially outside of the hook 5 (i.e., opposite from the insert hole 40). The insert space 6 is a space where the body 50 of the hook 5 is flexed radially outward when the cylindrical portion 41 is fitted onto the column 20.

The opening 60 of the insert space 6 is opened toward one end in the Y-axis direction. In other words, the opening 60 is opened perpendicularly to the direction in which the insert hole 40 penetrates through the base body 4.

In addition, the insert space 6 is also opened toward one end in the Z-axis direction (i.e., toward the tip of the holding wall 44). A portion 45, located outside in the X-axis direction of the insert space 6 (i.e., located opposite from the insert hole 40), of the holding wall 44 may be deformed elastically away from the insert space 6.

A surface 450, facing the insert space 6, of the portion 45 is provided with two recesses 46a, 46b. Each of the two recesses 46a, 46b is a recessed groove elongated in the Z-axis direction. The two recesses 46a, 46b are provided to be spaced from each other in the Y-axis direction. The recess 46a is provided to face the hook 5, while the recess 46b is located closer to the opening 60 than the hook 5 is. The recess 46b serves as a holding structure 8 for holding the locking member 7 at an unlocked position where the locking member 7 is out of contact with the hook 5. The surface 450 of the portion 45 is parallel to the outer surface 500 of the body 50 of the hook 5.

As shown in FIG. 1, the base body 4 is provided with a pair of attachment portions 47 to which the operating members 3 are attached. In this embodiment, each of the pair of attachment portions 47 is an attachment portion 9 to which another member is attached. In this embodiment, another member is the operating member 3.

The cylindrical portion 41 is located between the pair of attachment portions 47. The pair of attachment portions 47 and the cylindrical portion 41 are arranged in line. In this embodiment, each of the pair of attachment portions 47 is configured as a recess opened in a direction pointing away from the cylindrical portion 41. The recess is also opened toward one end in the Z-axis direction. The operating member 3 is inserted into, and attached onto, each of the pair of attachment portions 47 by making the operating member 3 move in a direction pointing toward the cylindrical portion 41 (i.e., toward one end in the X-axis direction). Note that the operating members 3 do not have to be attached to the attachment portions 47 in this manner but may also be attached by any other known method as appropriate.

(2-3) Operating Member

Next, the operating member 3 will be described.

The operating member 3 is an operating lever for use to operate various types of onboard equipment including turn signal lamps, headlights, fog lamps, windshield wipers, and washers. In this embodiment, the operating member 3 includes an operating member 3a to be attached to the left attachment portion 47 and an operating member 3b to be attached to the right attachment portion 47.

The left operating member 3a is a windshield wiper system switch for use to operate, for example, windshield wipers and a washer. The right operating member 3b is a lamp system switch for use to operate, for example, turn signal lamps, headlights, and fog lamps. Each of the operating members 3a, 3b may be operated to swing in the Z-axis direction (i.e., in the forward/backward direction) and in the Y-axis direction (i.e., in the upward/downward direction).

As the operating member 3 is operated to swing, the switch contacts built in the operating member 3 are electrically connected or disconnected to/from each other. The electrical signal is transmitted to an electronic circuit in the moving vehicle 102 to allow the turn signals to be flickered or the operating velocity of the windshield wipers to be switched.

(2-4) Locking Member

The locking member 7 is a member provided to be insertable into, and removable from, the insert space 6. The shape of the locking member 7 corresponds to that of the insert space 6.

The locking member 7 includes a bar-shaped (specifically, a rectangular bar-shaped) body 70 and a tab portion 71 provided for one longitudinal end portion of the body 70. In this embodiment, the tab portion 71 is a bar-shaped (specifically, a rectangular bar-shaped) portion extended perpendicularly from one longitudinal end portion of the body 70. The body 70 and the tab portion 71 are arranged to form an L-pattern.

As shown in FIGS. 1, 4A, and 4B, the body 70 is provided with two projections 72a, 72b. Each of the projections 72a, 72b is a raised portion elongated in the Z-axis direction. Each of the projections 72a, 72b is provided on one surface, facing toward one end in the X-axis direction, of the body 70 to extend along the entire length in the Z-axis direction of the body 70. When taken along a plane intersecting at right angles with the longitudinal axis of the projections 72a, 72b, a cross section of the projections 72a, 72b has a semicircular shape.

The projection 72a is located closer to the tip of the body 70 (i.e., located more distant from the tab portion 71) than the projection 72b is. The projection 72b is located closer to the basal end of the body 70 (i.e., located closer to the tab portion 71) than the projection 72a is. The arrangement of the projections 72a, 72b corresponds to the arrangement of the two recesses 46a, 46b.

The locking member 7 is inserted into the insert space 6 through the opening 60 of the insert space 6. The locking member 7 is movable between the locked position shown in FIG. 4A and the unlocked position shown in FIG. 4B. As used herein, the locked position refers to a position at which the projection 72a, located closer to the tip, of the locking member 7 is fitted into the recess 46a more distant from the front end and at which the projection 72b, located closer to the basal end, of the locking member 7 is fitted into the recess 46b closer to the front end. The unlocked position herein refers to a position at which the projection 72a, located closer to the tip, of the locking member 7 is fitted into the recess 46b closer to the front end and at which the projection 72b, located closer to the basal end, of the locking member 7 is located outside of the opening 60. The locking member 7 may be drawn in its entirety out of the insert space 6.

As shown in FIG. 4A, when the locking member 7 is located at the locked position, the body 70 of the locking member 7 is located radially outside of the hook 5 (i.e., located opposite from the insert hole 40). At this time, the body 70 of the locking member 7 and the body 50 of the hook 5 are in contact with each other. Alternatively, at this time, the body 70 of the locking member 7 and the body 50 of the hook 5 may be out of contact with each other with a narrow gap left between themselves. Bringing the body 50 of the hook 5 into contact with the body 70 of the locking member 7 allows the radially outward movement (i.e., the movement in a direction in which the hook 5 disengages itself from the fixing hole 21) of the hook 5 to be regulated.

As shown in FIG. 4B, when the locking member 7 is located at the unlocked position, the body 70 of the locking member 7 is located closer to the opening 60 than the hook 5 is. At this time, there is a vacant space radially outside of the body 50 of the hook 5. This allows the body 50 of the hook 5 to move radially outward.

When the body 70 of the locking member 7 is inserted into the opening 60 of the insert space 6, a portion 45 of the holding wall 44 is pressed by the projection 72a of the locking member 7 to be elastically deformed and flexed outward. Inserting the locking member 7 to the unlocked position causes the portion 45 of the holding wall 44 to recover the previous state (i.e., return to the previous position).

As the locking member 7 is inserted even deeper than the unlocked position, the portion 45 of the holding wall 44 is pressed again by the projections 72a, 72b of the locking member 7 to be elastically deformed and flexed outward. Inserting the locking member 7 to the locked position causes the portion 45 of the holding wall 44 to recover the previous state (i.e., return to the previous position). This allows the locking member 7 having the projections 72a, 72b to be inserted into the insert space 6. Likewise, when the locking member 7 is drawn out of the insert space 6, the portion 45 of the holding wall 44 is also elastically deformed in the same way.

(2-5) Mounting Unit

As shown in FIG. 1, the mounting unit 100 includes the mount base 1 described above and the locking member 7 to be inserted into the insert space 6 of the mount base 1. As shown in FIG. 4B, inserting the locking member 7 to the unlocked position with respect to the insert space 6 of the mount base 1 allows the locking member 7 to be held by the mount base 1.

(2-6) Operating Device

As shown in FIG. 2, the operating device 101 includes the mounting unit 100 described above and the operating member 3 held by the mount base 1 of the mounting unit 100. In this embodiment, the operating device 101 includes a pair of operating members 3a, 3b. The pair of operating members 3a, 3b are attached to the pair of attachment portions 47 of the mount base 1.

(2-7) Moving Vehicle

Figure 3:
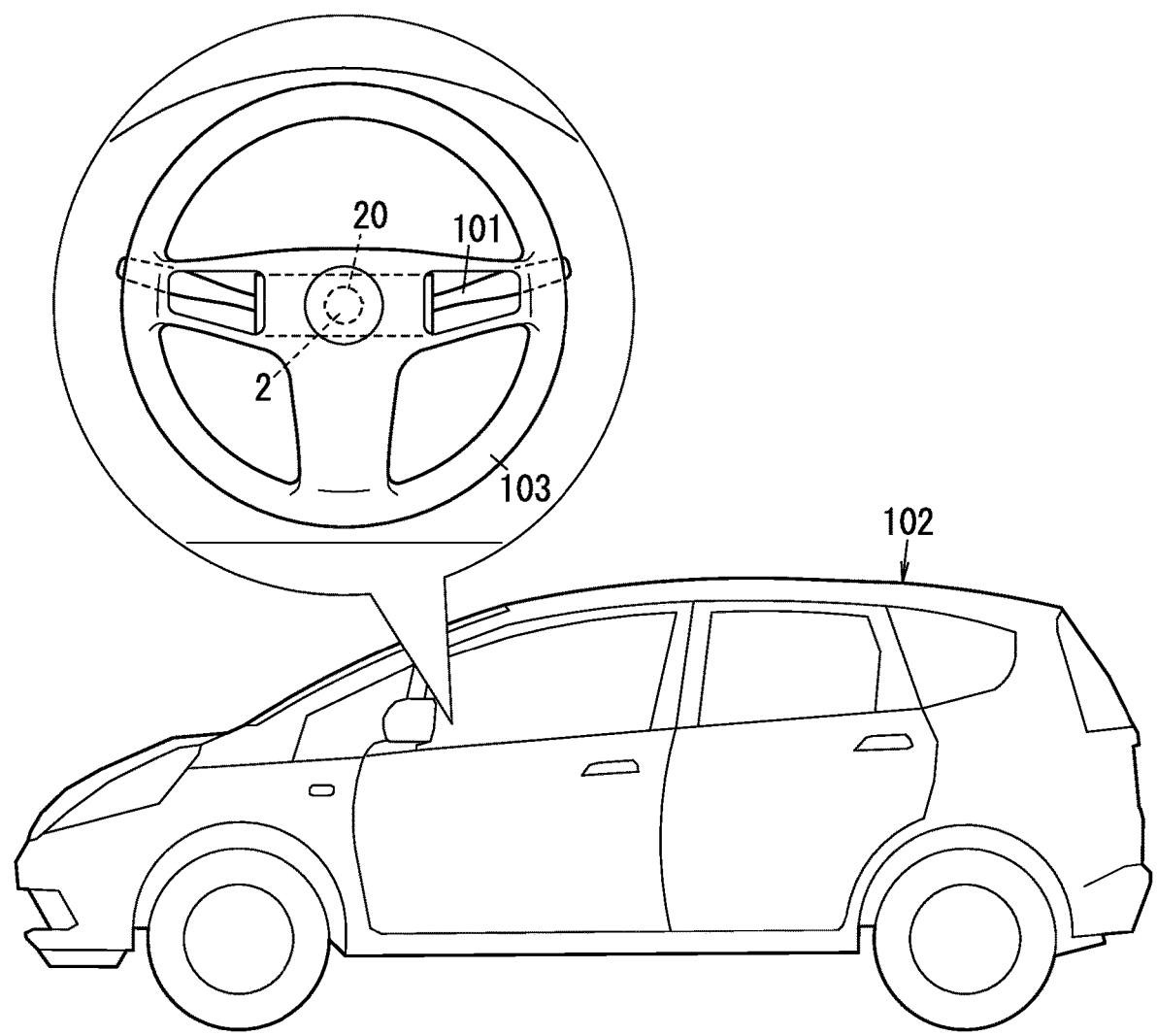
FIG. 3 is a schematic representation illustrating a moving vehicle including the operating device.

As shown in FIG. 3, the moving vehicle 102 includes the operating device 101 described above, a steering shaft 2 passing through the insert hole 40 (see FIG. 1) of the operating device 101, and the column 20 for rotatably supporting the steering shaft 2 thereon. In this embodiment, the moving vehicle 102 is implemented as an automobile (specifically, a four-wheeled vehicle).

The operating device 101 is mounted on the column 20 of the moving vehicle 102. A steering wheel 103 is mounted on the tip portion of the steering shaft 2. Although the steering wheel 103 of the moving vehicle 102 is shown inside a balloon in FIG. 3, the balloon is an insubstantial one.

(3) Methods for Assembling Operating Device and Mounting the Operating Device onto Moving Vehicle Next, an exemplary method for assembling the operating device 101 will be described.

First of all, the operating members 3a, 3b are attached to the pair of attachment portions 47 of the mount base 1 shown in FIG. 1. Next, the locking member 7 is inserted into the opening 60 of the insert space 6 of the mount base 1. The locking member 7 is inserted to the unlocked position where the projection 72a is fitted into the recess 46b (see FIG. 4B). One of the attachment of the pair of operating members 3a, 3b or the insertion of the locking member 7 may be performed earlier than the other, whichever is appropriate.

In this manner, an operating device 101 is formed by attaching the operating members 3a, 3b and the locking member 7 to the mount base 1.

Next, it will be described how to mount the operating device 101 onto the moving vehicle 102.

First, the cylindrical portion 41 of the operating device 101 is fitted, through the tip of the column 20 that is fixed to the moving vehicle 102, onto the column 20. At this point in time, the steering wheel 103 has not been mounted yet to the tip portion of the steering shaft 2 protruding from the column 20.

The column 20 is fitted into the cylindrical portion 41 of the mount base 1 of the operating device 101 such that the steering shaft 2 passes through the insert hole 40 of the mount base 1.

When the column 20 is inserted into the cylindrical portion 41 of the mount base 1, the pair of protruding portions 51 of the hook 5 and the respective projections 111 of the pair of second hooks 11 are pressed radially outward by the tip surface of the column 20, which causes the body 50 of the hook 5 and the respective bodies 110 of the pair of second hooks 11 to be flexed radially outward. The operating device 101 is inserted with respect to the column 20 to an attachment position at which the tip surface of the column 20 comes into contact with the receiving portion 42 of the mount base 1.

As shown in FIG. 6, at the attachment position, the pair of protruding portions 51 of the hook 5 have been inserted into the fixing hole 21 of the column 20 and the projections 111 of the pair of second hooks 11 have been inserted into the pair of second fixing holes 22 of the column 20. The pair of protruding portions 51 of the hook 5 comes into contact with both circumferential edges 210 of the fixing hole 21 of the column 20. In this embodiment, the respective fitting surfaces 511 of the pair of protruding portions 51 of the hook 5 are bitten by both circumferential edges 210 of the fixing hole 21 of the column 20. This allows the hook 5 to regulate the rotation of the operating device 101 with respect to the column 20. At the attachment position, each of the pair of protruding portions 51 of the hook 5 is located out of contact with both edges 211 in the Z-axis direction of the fixing hole 21 of the column 20.

In addition, at the attachment position, the catching surface 113 of the projection 111 of each of the pair of second hooks 11 is located to face the edge 220, located closer to the tip of the column 20, of an associated one of the second fixing holes 22 of the column 20. At this time, the catching surface 113 of the projection 111 of each of the pair of second hooks 11 may be caught on the edge 220 of the associated one of the second fixing holes 22. This allows the pair of second hooks 11 to regulate the disengagement of the operating device 101 from the column 20.

Next, the locking member 7 at the unlocked position is inserted deeper into the insert space 6 to reach the locked position. As shown in FIG. 4A, when the locking member 7 is located at the locked position, the projection 72a of the locking member 7 is fitted into the recess 46a of the mount base 1, the projection 72b of the locking member 7 is fitted into the recess 46b of the mount base 1, and the body 70 of the locking member 7 is located radially outside of the hook 5. At this time, the body 50 of the hook 5 and the body 70 of the locking member 7 are in contact with each other. This reduces the chances of the body 50 of the hook 5 moving radially outward to let the pair of protruding portions 51 of the hook 5 move in a direction in which the pair of protruding portions 51 disengage themselves from the fixing hole 21 of the column 20.

As can be seen, arranging the locking member 7 at the locked position allows the operating device 101 to be fixed with respect to the column 20. Even if external force is applied in this state in such a direction as to cause the mount base 1 of the operating device 101 to be disengaged from the column 20, it is still easy to maintain the state where the pair of protruding portions 51 of the hook 5 are fitted into the fixing hole 21 of the column 20, thus reducing the chances of canceling the state where the operating device 101 is fixed onto the column 20.

To remove the operating device 101 from the column 20, the locking member 7 may be either shifted to the unlocked position or drawn out of the insert space 6. This allows the hook 5 to move radially outward, thus enabling the pair of protruding portions 51 of the hook 5 to be removed from the fixing hole 21 of the column 20. Meanwhile, each of the pair of second hooks 11 may have its projection 111 removed from an associated one of the second fixing holes 22 of the column 20 by causing the second hook 11 to move radially outward using a tool, for example. As the operating device 101 is shifted in a direction pointing away from the column 20 with the pair of second hooks 11 removed from the second fixing holes 22, the hook 5 is pressed by the edge 211 of the fixing hole 21 and the outer peripheral surface of the column 20 to be flexed radially outward. In this manner, the operating device 101 may be removed from the column 20.

Second Embodiment

Next, a mount base 1A, a mounting unit 100A, and an operating device 101A according to a second embodiment shown in FIGS. 7-9B will be described in detail. The following description of the second embodiment will be focused on constituent elements different from their counterparts of the first embodiment.

In the mount base 1A of the second embodiment, the opening 60 of the insert space 6 is opened toward one attachment portion 47 (e.g., the left attachment portion 47 in this embodiment) out of the pair of attachment portions 47 of the mount base 1A. In this embodiment, the opening 60 is opened toward one end in the X-axis direction, i.e., perpendicularly to the direction in which the insert hole 40 penetrates through (i.e., the Z-axis direction).

The hook 5 is provided for one end portion in the Y-axis direction of the cylindrical portion 41. The pair of second hooks 11 are provided for both end portions in the X-axis direction of the cylindrical portion 41. The holding wall 44 is located outside in the Y-axis direction of the cylindrical portion 41 to surround the hook 5.

The locking member 7 has the length of its body 70 set to be shifted from the unlocked position (see FIG. 9B) to the locked position (see FIG. 9A) by being pressed by the operating member 3a while the operating member 3a is inserted into, and attached onto, one of the attachment portions 47 of the mount base 1A.

The direction in which the operating member 3a is inserted into the attachment portion 47 agrees with the direction in which the locking member 7 is inserted into the insert space 6. In this embodiment, these directions are both aligned with the X-axis direction.

Figure 9A:
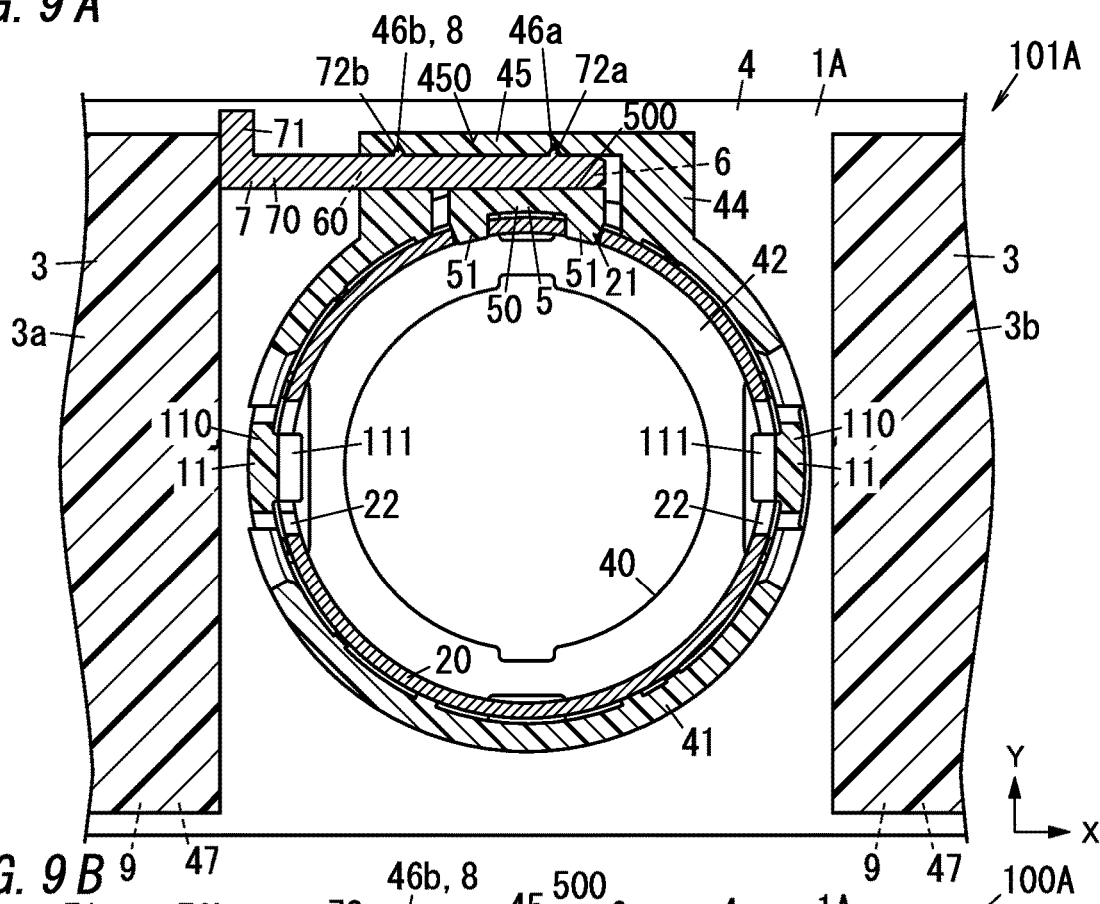
FIG. 9A is a cross-sectional view taken along the plane C-C shown in FIG. 8 and illustrating a state where the operating device is mounted onto the column.
Figure 9B:
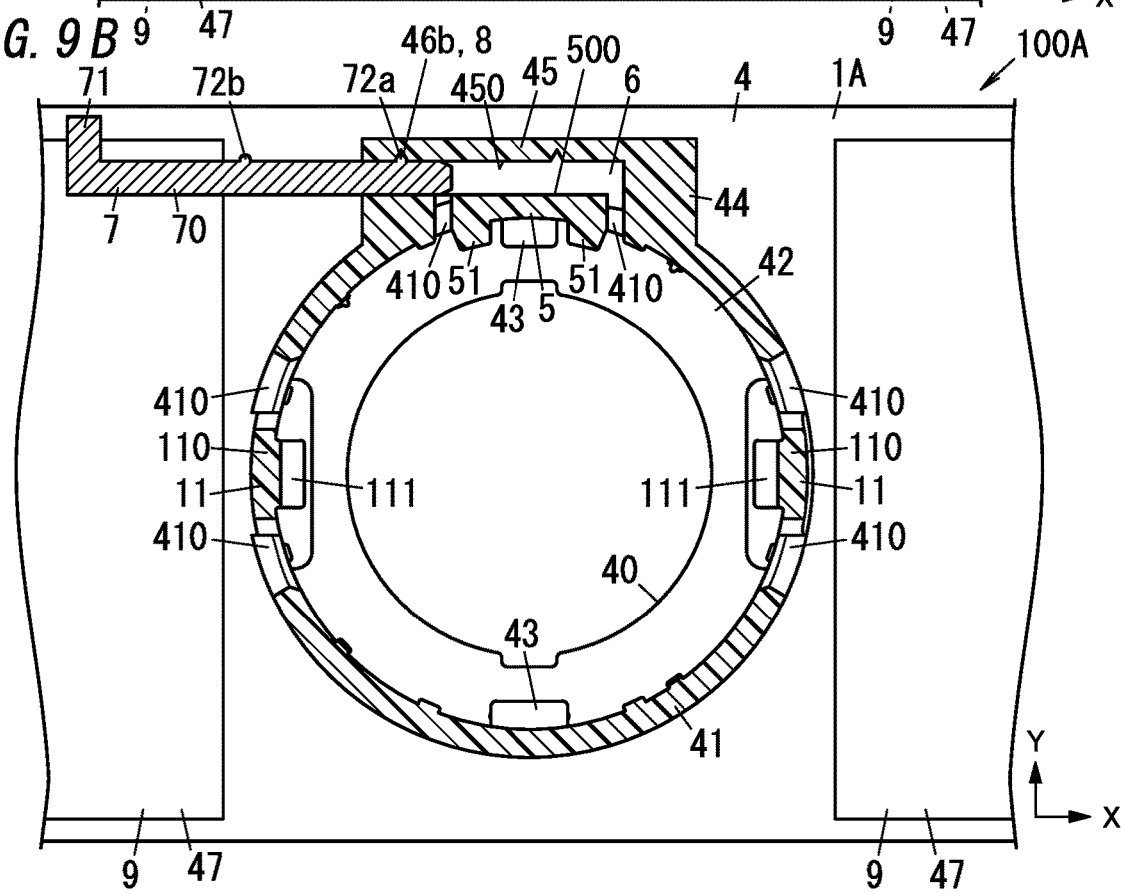
FIG. 9B is a cross-sectional view corresponding to the one shown in FIG. 9A and illustrating a state where the operating device is yet to be mounted onto the column.
Figure 10:
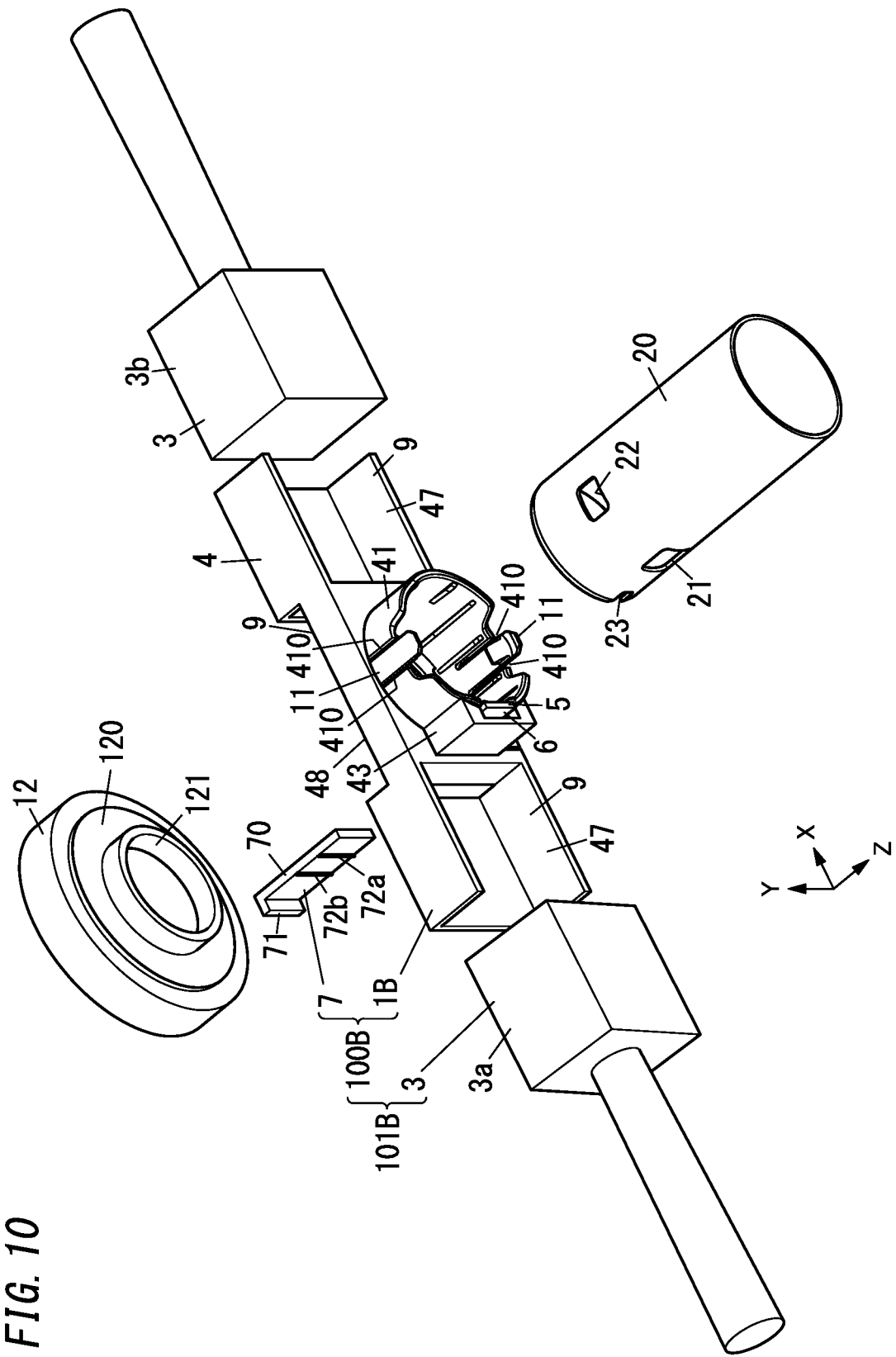
FIG. 10 is an exploded perspective view schematically illustrating an operating device according to a third embodiment.
Figure 11:
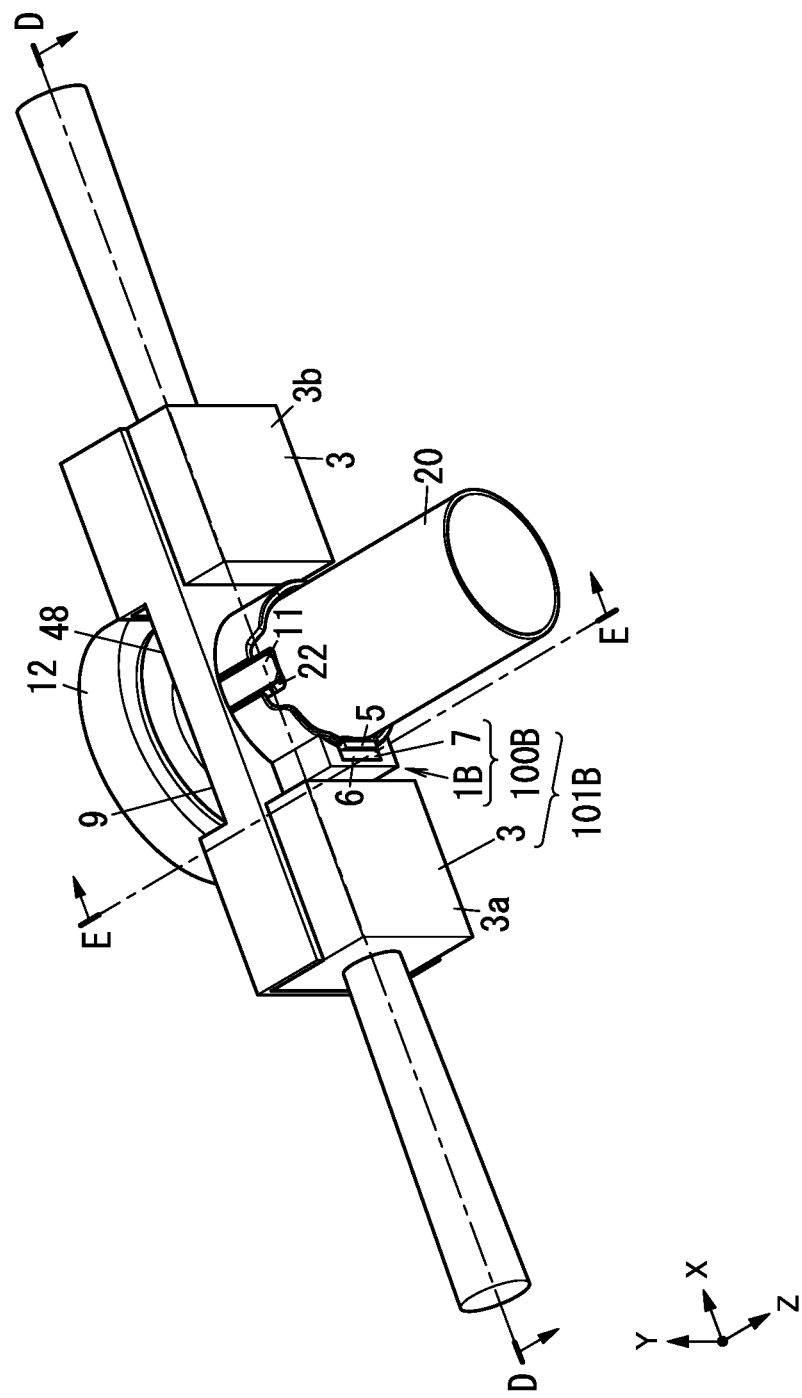
FIG. 11 is a perspective view schematically illustrating an assembled state of the operating device.
Figure 12:
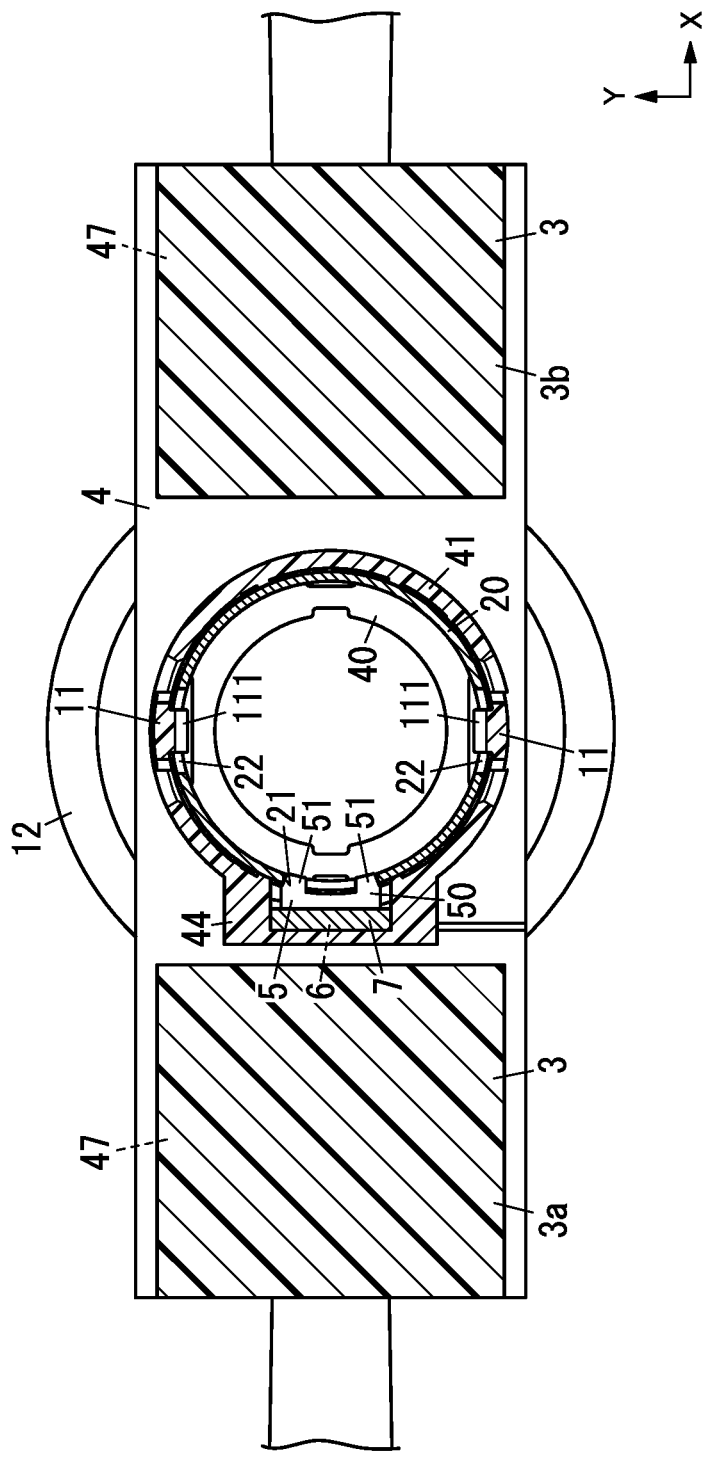
FIG. 12 is a cross-sectional view taken along the plane D-D shown in FIG. 11.

In the operating device 101A of the second embodiment, after the cylindrical portion 41 of the mounting unit 100A shown in FIG. 9B has been fitted onto the column 20, the operating members 3a, 3b are attached onto the pair of attachment portions 47. In the operating device 101A of the second embodiment, while the operating member 3a is inserted into, and attached onto, the attachment portion 47, the locking member 7 at the unlocked position may be pressed by the operating member 3a to be shifted to the locked position.

Therefore, the operating device 101A according to the second embodiment eliminates the need to shift the locking member 7 from the unlocked position to the locked position by gripping the tab portion 71 of the locking member 7, thus facilitating mounting the operating device 101A.

Third Embodiment

Next, a mount base 1B, a mounting unit 100B, and an operating device 101B according to a third embodiment shown in FIGS. 10-13B will be described in detail. The following description of the third embodiment will be focused on constituent elements different from their counterparts of the first embodiment.

The mount base 1B of the third embodiment includes, as another attachment portion 9 to which another member is attached, a second attachment portion 48, to which a housing member 12 is attached. The housing member 12 houses a spiral cable for use as a cable for an air bag or a horn. In this embodiment, another member is the housing member 12. The housing member 12 includes a disklike body 120 and a circular cylindrical portion 121 protruding toward one end in the Z-axis direction from the body 120. The spiral cable is housed in the body 120.

Figure 13A:
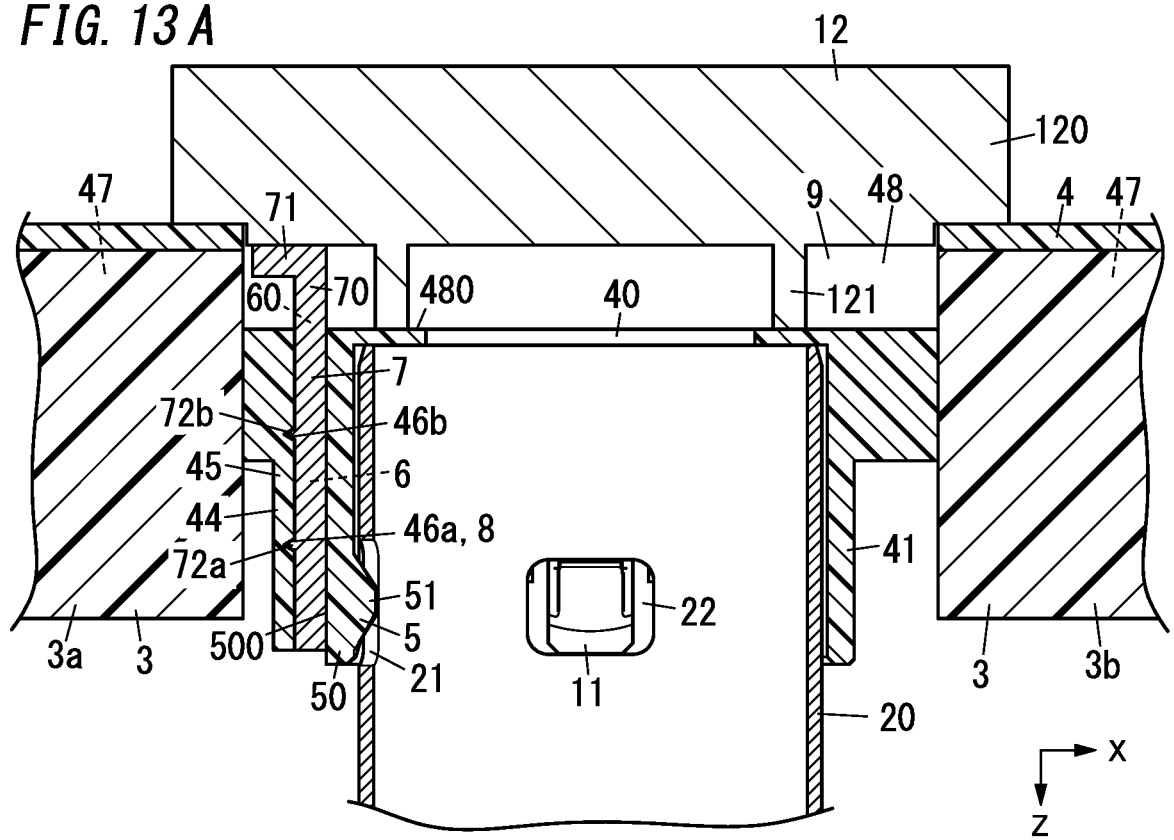
FIG. 13A is a cross-sectional view taken along the plane E-E shown in FIG. 11 and illustrating a state where the operating device is mounted onto the column.
Figure 13B:
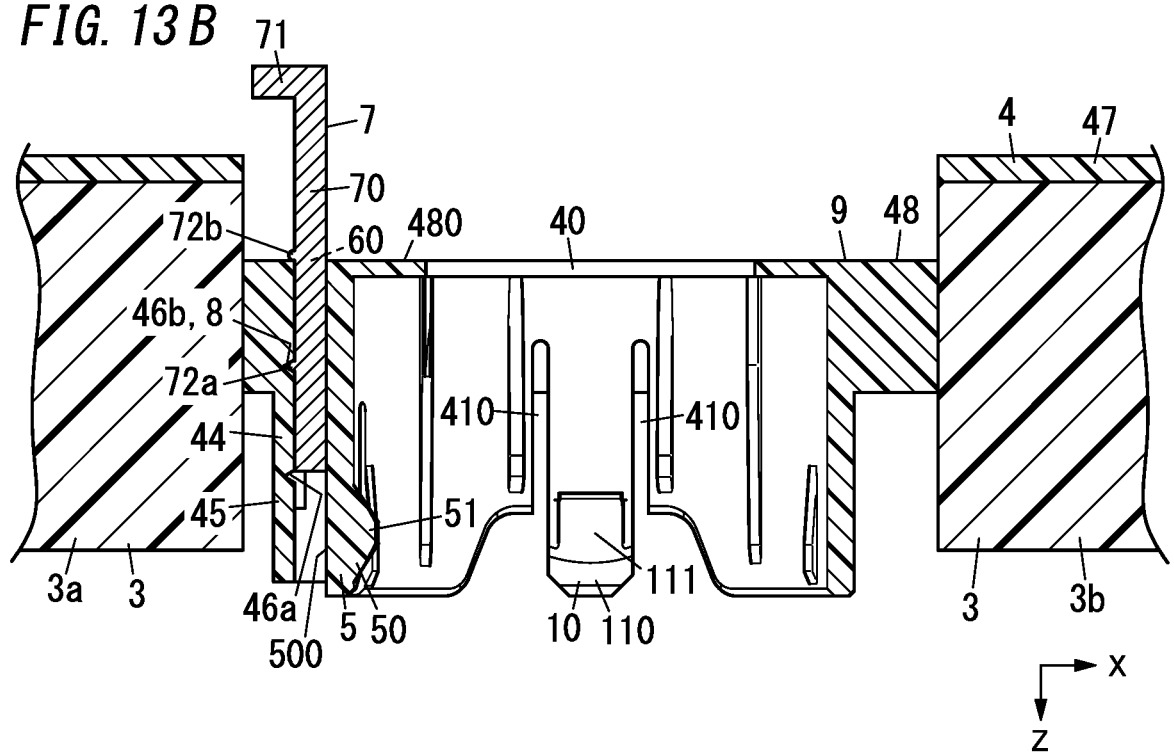
FIG. 13B is a cross-sectional view corresponding to the one shown in FIG. 13A and illustrating a state where the operating device is yet to be mounted onto the column.

As shown in FIGS. 13A and 13B, the second attachment portion 48 is a recess, provided opposite from the cylindrical portion 41, of the base body 4. This recess is opened toward one end in the Z-axis direction (more specifically, toward the opposite end from the cylindrical portion 41). The housing member 12 is inserted into, and attached onto, the second attachment portion 48 by being shifted toward the second attachment portion 48.

The opening 60 of the insert space 6 is opened toward the second attachment portion 48 (i.e., toward the attachment portion 9). In this embodiment, the opening 60 is opened toward one end in the Z-axis direction, i.e., in the direction in which the insert hole 40 penetrates through. More specifically, the opening 60 is provided through a bottom surface 480 of the second attachment portion 48. The insert space 6 penetrates in the Z-axis direction through the base body 4 and the holding wall 44.

The locking member 7 has the length of its body 70 set to be shifted from the unlocked position (see FIG. 13B) to the locked position (see FIG. 13A) by being pressed by the body 120 of the housing member 12 while the housing member 12 is inserted into, and attached onto, the second attachment portion 48 of the mount base 1B.

The direction in which the housing member 12 is inserted into the second attachment portion 48 agrees with the direction in which the locking member 7 is inserted into the insert space 6. In this embodiment, these directions are both aligned with the Z-axis direction.

In the operating device 101B of the third embodiment, after the cylindrical portion 41 has been fitted onto the column 20, the housing member 12 is attached onto the second attachment portion 48 of the mount base 1B. Then, the locking member 7 at the unlocked position may be pressed by the housing member 12 to be shifted to the locked position.

Therefore, the operating device 101B according to the third embodiment eliminates the need to shift the locking member 7 from the unlocked position to the locked position by gripping the tab portion 71 of the locking member 7, thus facilitating mounting the operating device 101B.

Variations

Next, variations of the mount bases 1, 1A, 1B, the mounting units 100, 100A, 100B, the operating devices 101, 101A, 101B, and the moving vehicle 102 according to the first to third embodiments described above will be enumerated one after another.

Figure 14:
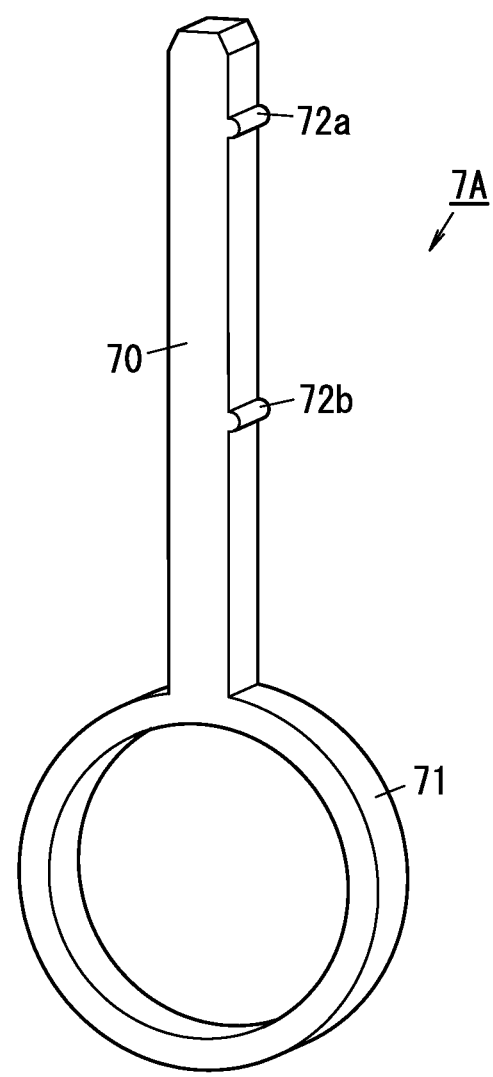
FIG. 14 is a perspective view illustrating another exemplary locking member to be provided for the operating device according to the first to third embodiments.

The tab portion 71 of the locking member 7 does not have to have the bar shape shown in FIG. 1 and other drawings but may also have a ring shape as in the variation of the locking member 7A shown in FIG. 14. This facilitates the job of drawing out the locking member 7A.

Figure 15:
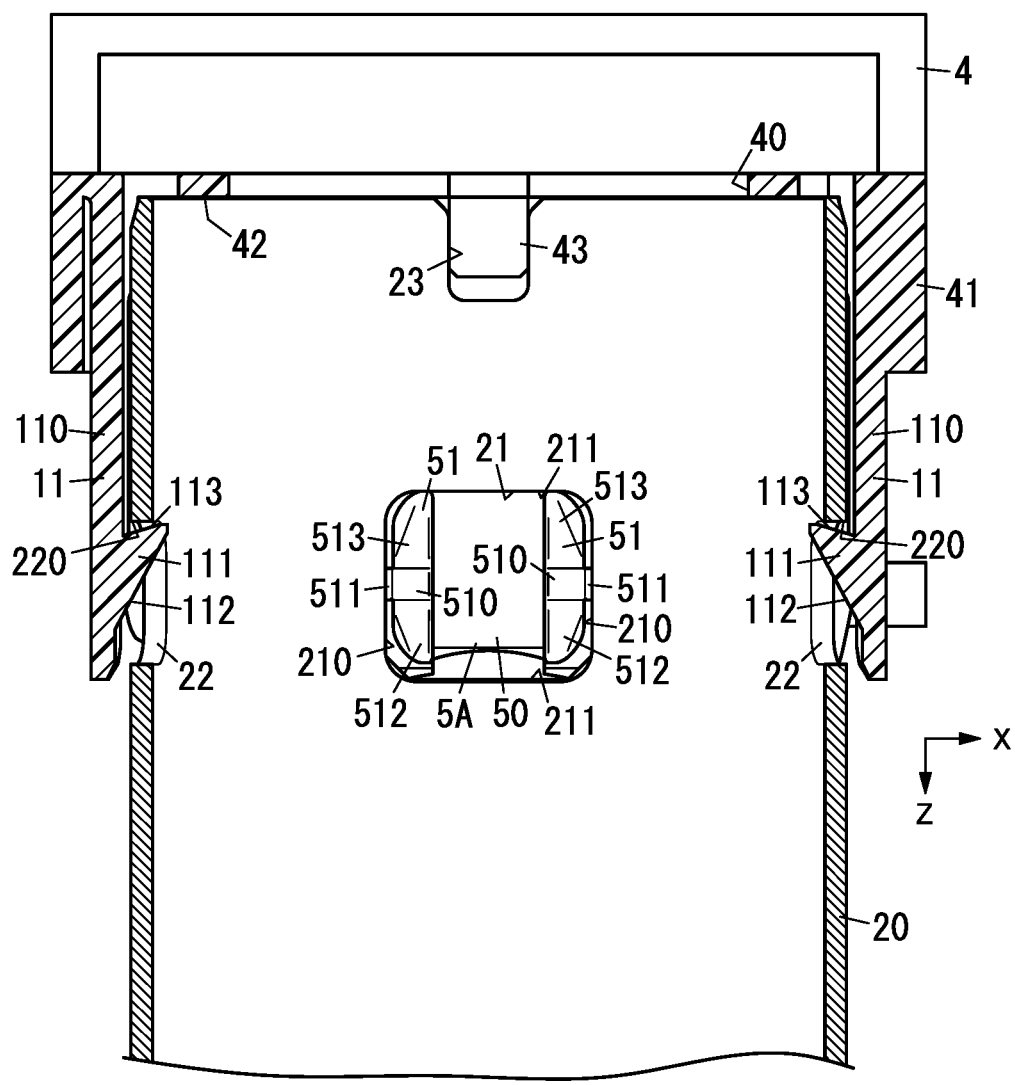
FIG. 15 is a cross-sectional view illustrating another exemplary hook to be provided for the operating device according to the first to third embodiments.

Also, as in the variation shown in FIG. 15, the hook 5 may include stopper portions for preventing the base body 4 from being disengaged from the column 20. Specifically, the pair of protruding portions 51 of the hook 5 each have a catching surface to be caught on an edge 211 on one side in the Z-axis direction (more specifically, an edge closer to the tip of the column 20) of the fixing hole 21 of the column 20 in a state where the cylindrical portion 41 is fitted onto the column 20. The catching surface may be, for example, a stepped surface provided between the second sloped surface 513 of one of the protruding portions 51 and the body 50. Optionally, the pair of protruding portions 51 may each have a catching surface having the same shape as the projections 111 of the second hooks 11.

Furthermore, the hook 5 may have either only one of the stopper portion for preventing the base body 4 from rotating with respect to the column 20 or the stopper portion for preventing the base body 4 from being disengaged from the column 20 or both of these two stopper portions.

Furthermore, the fitting surface 511 of the hook 5 may be provided just to come into contact with the edge 210 of the fixing hole 21 of the column 20, instead of being bitten by the edge 210.

Furthermore, the holding structure 8 may be any structure for holding the locking member 7 at the unlocked position where the locking member 7 is out of contact with the hook 5. Thus, the holding structure 8 does not have to be the recess 46b but may also be a projection or a plane to be pressed against the locking member 7. If the holding structure 8 is configured as a projection, then the locking member 7 is provided with a recess to which the projection is fitted.

Furthermore, in the mount base 1A according to the second embodiment, each of the attachment portions 47 and the cylindrical portion 41 have only to be arranged in line. For example, the direction in which one attachment portion 47 and the cylindrical portion 41 are arranged side by side may intersect with the direction in which the other attachment portion 47 and the cylindrical portion 41 are arranged side by side. Even in that case, the opening 60 of the insert space 6 is provided to be opened toward one attachment portion 47.

Furthermore, the attachment portion 9 provided for the mount bases 1A, 1B according to the second and third embodiments and another member to be attached to the attachment portion 9 do not have to be the combination of the attachment portions 47, 48, the operating member 3a, and the housing member 12, but may also be a combination of any other attachment portion and any other member.

Optionally, the mount bases 1, 1A according to the first and second embodiment may each include the second attachment portion 48. The moving vehicle 102 provided with the mount base 1, 1A according to the first or second embodiment may include the housing member 12 in which the spiral cable is housed.

Furthermore, the locking member 7 according to the second or third embodiment may also be provided integrally with another member (more specifically, the operating member 3a or the housing member 12). Even in that case, attaching another member (more specifically, the operating member 3a or the housing member 12) to the attachment portion 9 (i.e., the attachment portion 47, 48) also allows the locking member 7 to be inserted to the locked position in the insert space 6.

Furthermore, in the operating devices 101A, 101B according to the second and third embodiments, the direction in which another member (more specifically, the operating member 3a or the housing member 12) is inserted into the attachment portion 9 (i.e., the attachment portion 47, 48) does not have to agree with the direction in which the locking member 7 is inserted into the insert space 6. The operating devices 101A, 101B according to the second and third embodiments has only to be configured such that inserting another member (more specifically, the operating member 3a or the housing member 12) into the attachment portion 9 (i.e., the attachment portion 47, 48) allows the locking member 7 to be pressed by that another member and inserted into the insert space 6.

Furthermore, in the operating devices 101, 101B according to the first and third embodiments, at least one of the operating members 3a, 3b does not have to be inserted into, and attached onto, the attachment portion 47 of the mount base 1, 1B but may also be fixed onto, and held by, the mount base 1, 1B. In that case, the job of attaching at least one of the operating members 3a, 3b onto the attachment portion(s) 47 before or after fitting the column 20 into the cylindrical portion 41 of the mount base 1, 1B may be omitted.

Likewise, in the operating device 101A according to the second embodiment, the operating member 3b does not have to be inserted into, and attached onto, the attachment portion 47 of the mount base 1A but may also be fixed onto, and held by, the mount base 1A. In that case, the job of attaching the operating member 3b onto the attachment portion 47 before or after fitting the column 20 into the cylindrical portion 41 of the mount base 1A may be omitted.

Furthermore, in the operating devices 101A, 101B according to the second and third embodiments, the locking member 7 does not have to be shifted to the locked position by being pressed by either the operating member 3a or the housing member 12 but may also be shifted to the locked position with the tab portion 71 of the locking member 7 gripped.

Furthermore, the moving vehicle 102 does not have to be an automobile (e.g., a four-wheeled vehicle in this embodiment) but may also be, for example, a two-wheeled vehicle, a railway train, an electric cart, an aircraft, a construction machine, or a watercraft as well.

Recapitulation

As can be seen from the foregoing description, a mount base (1, 1A, 1B) according to a first aspect has the following configuration:

Specifically, the mount base (1, 1A, 1B) according to the first aspect is a member for mounting an operating member (3) onto a column (20) to rotatably support a steering shaft (2) thereon. The mount base (1, 1A, 1B) includes a base body (4), a hook (5), and an insert space (6). The base body (4) has an insert hole (40) to pass the steering shaft (2) therethrough and holds the operating member (3) thereon. The hook (5) is insertable into a fixing hole (21) of the column (20). The insert space (6) is located opposite from the insert hole (40) with respect to the hook (5). The hook (5) comes into contact with a locking member (7) inserted into the insert space (6) to have its movement regulated in a direction in which the hook (5) disengages itself from the fixing hole (21).

According to this aspect, inserting a locking member (7) into the insert space (6) allows the locking member (7) to regulate movement of the hook (5) in a direction in which the hook (5) disengages itself from the fixing hole (21). This eliminates the need to draw the expansion pin out of the band clamp and dispose of the expansion pin, which is required in the known example, thus facilitating mounting the mount base (1, 1A, 1B) onto the column (20). This makes it easier to mount the operating member (3) onto the column (20).

A mount base (1, 1A, 1B) according to a second aspect, which may be implemented in conjunction with the first aspect, further has the following configuration:

Specifically, in the mount base (1, 1A, 1B) according to the second aspect, the hook (5) includes a stopper portion (specifically, a fitting surface 511) to come into contact with an edge (210) of the fixing hole (21) to prevent the base body (4) from rotating with respect to the column (20).

According to this aspect, the hook (5), of which the movement is regulated in the direction in which the hook (5) disengages itself from the fixing hole (21), may prevent, with more reliability, the base body (4) from rotating with respect to the column (20).

A mount base (1, 1A, 1B) according to a third aspect, which may be implemented in conjunction with the first or second aspect, further has the following configuration:

Specifically, in the mount base (1, 1A, 1B) according to the third aspect, the hook (5A) includes a stopper portion (specifically, a catching surface of a protruding portion 51) to come into contact with an edge (211) of the fixing hole (21) to prevent the base body (4) from disengaging itself from the column (20).

According to this aspect, the hook (5A), of which the movement is regulated in the direction in which the hook (5A) disengages itself from the fixing hole (21), may prevent, with more reliability, the base body (4) from disengaging itself from the column (20).

A mount base (1, 1A, 1B) according to a fourth aspect, which may be implemented in conjunction with any one of the first to third aspects, further has the following configuration:

Specifically, the mount base (1, 1A, 1B) according to the fourth aspect further includes a holding structure (8) to hold the locking member (7) at an unlocked position where the locking member (7) is out of contact with the hook (5).

According to this aspect, a holding structure (8) of the mount base (1, 1A, 1B) allows the locking member (7) to be held at an unlocked position, thus making the mount base (1, 1A, 1B) and the locking member (7) easily portable. In addition, since the locking member (7) is held at the unlocked position where the locking member (7) is out of contact with the hook (5), the locking member (7) does not interfere with movement of the hook (5) toward the insert space (6).

A mount base (1, 1A, 1B) according to a fifth aspect, which may be implemented in conjunction with the second aspect, further has the following configuration:

Specifically, in the mount base (1, 1A, 1B) according to the fifth aspect, the hook (5) has a portion (specifically, a fitting surface 511) to be bitten by the edge (210) of the fixing hole (21).

According to this aspect, the hook (5) to be bitten by the edge (210) of the fixing hole (21) may prevent, with more reliability, the base body (4) from rotating with respect to the column (20).

A mount base (1, 1A) according to a sixth aspect, which may be implemented in conjunction with any one of the first to fifth aspects, further has the following configuration:

Specifically, in the mount base (1, 1A) according to the sixth aspect, the insert space (6) has an opening (60) through which the locking member (7) is inserted. The opening (60) is opened in a direction perpendicular to a direction in which the insert hole (40) penetrates through the base body (4).

According to this aspect, with the axial direction of the steering shaft (2) inserted into the insert hole (40) (i.e., the direction in which the insert hole (40) penetrates through the base body (4)) used as a reference direction, the locking member (7) may be inserted perpendicularly to the reference direction, thus facilitating inserting the locking member (7) into the insert space (6).

A mount base (1B) according to a seventh aspect, which may be implemented in conjunction with any one of the first to fifth aspects, further has the following configuration:

Specifically, in the mount base (1B) according to the seventh aspect, the insert space (6) has an opening (60) through which the locking member (7) is inserted. The opening (60) is opened in a direction in which the insert hole (40) penetrates through the base body (4).

According to this aspect, with the axial direction of the steering shaft (2) inserted into the insert hole (40) (i.e., the direction in which the insert hole (40) penetrates through the base body (4)) used as a reference direction, the locking member (7) may be inserted parallel to the reference direction, thus facilitating inserting the locking member (7) into the insert space (6).

A mount base (1A, 1B) according to an eighth aspect, which may be implemented in conjunction with any one of the first to fifth aspects, further has the following configuration:

Specifically, the mount base (1A, 1B) according to the eighth aspect further includes an attachment portion (9) to which another member (such as the operating member 3 or a housing member 12) is attached. The insert space (6) has an opening (60) through which the locking member (7) is inserted. The opening (60) is opened toward the attachment portion (9).

According to this aspect, attaching another member (such as the operating member 3 or a housing member 12) to the attachment portion (9) allows that member to press and insert the locking member (7) into the insert space (6), thus saving the trouble of inserting the locking member (7) into the insert space (6).

A mounting unit (100, 100A, 100B) according to a ninth aspect includes the mount base (1, 1A, 1B) according to any one of the first to eighth aspects and the locking member (7) to be inserted into the insert space (6) of the mount base (1, 1A, 1B).

According to this aspect, inserting the locking member (7) into the insert space (6) allows the locking member (7) to regulate movement of the hook (5) in the direction in which the hook (5) disengages itself from the fixing hole (21). This eliminates the need to draw the expansion pin out of the band clamp and dispose of the expansion pin, which is required in the known example, thus facilitating mounting the mount base (1, 1A, 1B) onto the column (20). This makes it easier to mount the operating member (3) onto the column (20).

An operating device (101, 101A, 101B) according to a tenth aspect includes the mounting unit (100, 100A, 100B) according to the ninth aspect and the operating member (3) held by the mount base (1, 1A, 1B) of the mounting unit (100, 100A, 100B).

According to this aspect, inserting the locking member (7) into the insert space (6) allows the locking member (7) to regulate movement of the hook (5) in the direction in which the hook (5) disengages itself from the fixing hole (21). This eliminates the need to draw the expansion pin out of the band clamp and dispose of the expansion pin, which is required in the known example, thus facilitating mounting the mount base (1, 1A, 1B) onto the column (20). This makes it easier to mount the operating member (3) onto the column (20).

A moving vehicle (102) according to an eleventh aspect includes the operating device (101, 101A, 101B) according to the tenth aspect, the steering shaft (2), and the column (20). The steering shaft (2) passes through the insert hole (40) of the operating device (101, 101A, 101B). The column (20) supports the steering shaft (2) rotatably thereon.

According to this aspect, inserting the locking member (7) into the insert space (6) allows the locking member (7) to regulate movement of the hook (5) in the direction in which the hook (5) disengages itself from the fixing hole (21). This eliminates the need to draw the expansion pin out of the band clamp and dispose of the expansion pin, which is required in the known example, thus facilitating mounting the mount base (1, 1A, 1B) onto the column (20). This makes it easier to mount the operating member (3) onto the column (20).

In a mount base (1A) according to a twelfth aspect, which may be implemented in conjunction with the eighth aspect, that another member is the operating member (3).

According to this aspect, no members but the operating member (3) are needed as the members to press the locking member (7), thus reducing the number of members required.

Note that the constituent elements according to the second to eighth aspects and the twelfth aspect are not essential constituent elements for the mount base (1, 1A, 1B) but may be omitted as appropriate.

Although the present disclosure has been described with reference to the embodiments illustrated on the accompanying drawings, the embodiments described above are only exemplary ones of various embodiments of the present disclosure and should not be construed as limiting. Rather, the exemplary embodiments may be readily modified in various manners as appropriate depending on a design choice or any other factor without departing from the scope of the present disclosure.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. A mount base for use to mount an operating member onto a column configured to rotatably support a steering shaft thereon, the mount base comprising:
   a base body having an insert hole to pass the steering shaft therethrough and configured to hold the operating member thereon;
   a hook insertable into a fixing hole of the column; and
   an insert space located opposite from the insert hole with respect to the hook,
   the hook being configured to come into contact with a locking member inserted into the insert space to have its movement regulated in a direction in which the hook disengages itself from the fixing hole.

2. The mount base of claim 1, wherein
   the hook includes a stopper portion configured to come into contact with an edge of the fixing hole to prevent the base body from rotating with respect to the column.

3. The mount base of claim 1, wherein
   the hook includes a stopper portion configured to come into contact with an edge of the fixing hole to prevent the base body from disengaging itself from the column.

4. The mount base of claim 1, further comprising a holding structure configured to hold the locking member at an unlocked position where the locking member is out of contact with the hook.

5. The mount base of claim 2, wherein
   the hook has a portion configured to be bitten by the edge of the fixing hole.

6. The mount base of claim 1, wherein
   the insert space has an opening through which the locking member is inserted, and
   the opening is opened in a direction perpendicular to a direction in which the insert hole penetrates through the base body.

7. The mount base of claim 1, wherein
   the insert space has an opening through which the locking member is inserted, and
   the opening is opened in a direction in which the insert hole penetrates through the base body.

8. The mount base of claim 1, further comprising an attachment portion to which another member is attached, wherein
   the insert space has an opening through which the locking member is inserted, and
   the opening is opened toward the attachment portion.

9. The mount base of claim 8, wherein
   the another member is the operating member.

10. The mount base of claim 8, wherein
    the another member is a housing member which houses a spiral cable for use as a cable for an air bag or a horn.

11. The mount base of claim 1, wherein
from a region surrounding the insert hole of the base body, a cylindrical portion protrudes in a direction in which the insert hole penetrates through the base body,
the cylindrical portion has two slits which are arranged at intervals along its circumference,
the hook is a part, located between the two slits, of the cylindrical portion.

12. The mount base of claim 11, wherein
a holding wall protrudes to surround the hook from a portion, located radially outside of the cylindrical portion, of the base body,
a space between the holding wall and the cylindrical portion is the insert space.

13. A mounting unit comprising:
the mount base of claim 1; and
the locking member configured to be inserted into the insert space of the mount base.

14. The mounting unit of claim 13, wherein
the locking member includes a bar-shaped body and a bar-shaped tab portion provided for one longitudinal end portion of the body,
the body and the tab portion are arranged to form an L-pattern.

15. The mount unit of claim 14, wherein
the mount base further comprises an attachment portion to which another member is attached, wherein
the insert space has an opening through which the locking member is inserted, and
the opening is opened toward the attachment portion.

16. The mounting unit of claim 13, wherein
the locking member includes a bar-shaped body and a tab ring-shaped portion provided for one longitudinal end portion of the body.

17. An operating device comprising:
the mounting unit of claim 13; and
the operating member held by the mount base of the mounting unit.

18. The operating device of claim 17, wherein
the mount base further comprises an attachment portion to which another member is attached, wherein
the insert space has an opening through which the locking member is inserted, and
the opening is opened toward the attachment portion,
the another member is the operating member.

19. The operating device of claim 18, wherein
the locking member includes a bar-shaped body and a bar-shaped tab portion provided for one longitudinal end portion of the body,
the body and the tab portion are arranged to form an L-pattern.

20. A moving vehicle comprising:
the operating device of claim 17;
the steering shaft passing through the insert hole of the operating device; and
the column supporting the steering shaft rotatably thereon.

* * * * *